US005883865A

United States Patent [19]

Kondo et al.

[11] Patent Number: 5,883,865

[45] Date of Patent: *Mar. 16, 1999

[54] APPARATUS FOR RECORDING AND/OR REPRODUCING A RECORDING MEDIUM WITH EDITING FUNCTIONS

[75] Inventors: Tsuyoshi Kondo, Tokyo; Hiroshi Mukawa, Kanagawa, both of Japan

[73] Assignee: Sony Corporation, Tokyo, Japan

[ * ] Notice: The term of this patent shall not extend beyond the expiration date of Pat. No. 5,724,322.

[21] Appl. No.: 881,055

[22] Filed: Jun. 24, 1997

Related U.S. Application Data

[63] Continuation of Ser. No. 411,745, May 15, 1995, Pat. No. 5,724,322.

[30] Foreign Application Priority Data

| | | | |
|---|---|---|---|
| Aug. 10, 1993 | [JP] | Japan | 5-216921 |
| Nov. 25, 1993 | [JP] | Japan | 5-317531 |
| Aug. 10, 1994 | [WO] | WIPO | PCT/JP94/01324 |

[51] Int. Cl.[6] .................. G11B 17/22; G11B 5/09; G11B 3/90

[52] U.S. Cl. .................. 369/32; 369/47; 369/58

[58] Field of Search .................. 369/47, 48, 49, 369/50, 54, 58, 32

[56] References Cited

U.S. PATENT DOCUMENTS

| | | | |
|---|---|---|---|
| 5,124,963 | 6/1992 | Ando | 369/32 |
| 5,129,963 | 7/1992 | Ando | 369/54 X |
| 5,724,322 | 3/1998 | Kondo et al. | 369/58 X |

FOREIGN PATENT DOCUMENTS

| | | | |
|---|---|---|---|
| 0 587 388 a2 | 3/1994 | European Pat. Off. | G11B 27/32 |
| 0 595 358 A2 | 5/1994 | European Pat. Off. | G11B 27/24 |
| 0 595 358 A3 | 5/1994 | European Pat. Off. | G11B 27/24 |
| 63-222379 | 9/1988 | Japan | G11B 27/10 |
| 64-43887 | 2/1989 | Japan | G11B 27/00 |
| 5-89643 | 4/1993 | Japan | G11B 27/00 |
| A-6203533 | 7/1994 | Japan | G11B 27/34 |

*Primary Examiner*—Paul W. Huber
*Attorney, Agent, or Firm*—Limbach & Limbach L.L.P.

[57] ABSTRACT

The present invention is to provide an apparatus for recording and/or reproducing a recording medium which comprises recording and reproducing means for recording or reproducing data on or from a recording medium in which management information for recording or reproducing data is recorded together with data, designating means for designating a pause position of one data and control means for controlling the recording and reproducing means based on the management information such that the recording and reproducing means records or reproduces data on or from the recording medium, recognizing a time point at which the designating means is operated during data is recorded on or reproduced from the recording medium by the recording and reproducing means and controlling the recording and reproducing means so that the recording and reproducing means rewrites the management information.

6 Claims, 23 Drawing Sheets

| Section | Part | 16 bit (MSB–LSB) | (MSB–LSB) | 16 bit (MSB–LSB) | (MSB–LSB) | |
|---|---|---|---|---|---|---|
| Header | | 00000000 | 11111111 | 11111111 | 11111111 | 0 |
| Header | | 11111111 | 11111111 | 11111111 | 11111111 | 1 |
| Header | | 11111111 | 11111111 | 11111111 | 00000000 | 2 |
| Header | | Cluster H | Cluster L | 00000000 | 00000010 | 3 |
| | | 00000000 | 00000000 | 00000000 | 00000000 | 4 |
| | | 00000000 | 00000000 | 00000000 | 00000000 | 5 |
| | | M | I | N | I | 6 |
| | | Disc type | Rec power | First TNO | Last TNO | 7 |
| | | Read - out start address (ROA) | | | Used Sectors | 8 |
| | | Power cal area start address (PCA) | | | 00000000 | 9 |
| | | Start address (USTA) | | | 00000000 | 10 |
| | | Recordable user area start address (RSTA) | | | 00000000 | 11 |
| Corresponding table designating data portion | | 00000000 | P - TNO 1 | P - TNO 2 | P - TNO 3 | 12 |
| Corresponding table designating data portion | | P - TNO 4 | P - TNO 5 | P - TNO 6 | P - TNO 7 | 13 |
| Corresponding table designating data portion | | P - TNO 248 | P - TNO 249 | P - TNO 250 | P - TNO 251 | 74 |
| Corresponding table designating data portion | | P - TNO 252 | P - TNO 253 | P - TNO 254 | P - TNO 255 | 75 |
| | | 00000000 | 00000000 | 00000000 | 00000000 | 76 |
| | | 00000000 | 00000000 | 00000000 | 00000000 | 77 |
| Management table (255 - parts table) | (01) | Start address | | | Track mode | 78 |
| Management table (255 - parts table) | | End address | | | 00000000 | 79 |
| Management table (255 - parts table) | (02) | Start address | | | Track mode | 80 |
| Management table (255 - parts table) | | End address | | | 00000000 | 81 |
| Management table (255 - parts table) | (03) | Start address | | | Track mode | 82 |
| Management table (255 - parts table) | | End address | | | 00000000 | 83 |
| Management table (255 - parts table) | (FC) | Start address | | | Track mode | 580 |
| Management table (255 - parts table) | | End address | | | 00000000 | 581 |
| Management table (255 - parts table) | (FD) | Start address | | | Track mode | 582 |
| Management table (255 - parts table) | | End address | | | 00000000 | 583 |
| Management table (255 - parts table) | (FE) | Start address | | | Track mode | 584 |
| Management table (255 - parts table) | | End address | | | 00000000 | 585 |
| Management table (255 - parts table) | (FF) | Start address | | | Track mode | 586 |
| Management table (255 - parts table) | | End address | | | 00000000 | 587 |

P - TOC Sector 0

FIG. 10

| | | ← 16 bit → | | ← 16 bit → | | |
|---|---|---|---|---|---|---|
| | | MSB LSB | MSB LSB | MSB LSB | MSB LSB | |
| Header | | 00000000 | 11111111 | 11111111 | 11111111 | 0 |
| Header | | 11111111 | 11111111 | 11111111 | 11111111 | 1 |
| Header | | 11111111 | 11111111 | 11111111 | 00000000 | 2 |
| Header | | Cluster H | Cluster L | 00000000 | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| | | Disc | ID | P-DFA | P-EMPTY | 11 |
| Corresponding table designating data portion | | P-FRA | P-TNO1 | P-TNO2 | P-TNO3 | 12 |
| Corresponding table designating data portion | | P-TNO4 | P-TNO5 | P-TNO6 | P-TNO7 | 13 |
| | | | | | | |
| | | ... | ... | ... | ... | |
| | | | | | | |
| Corresponding table designating data portion | | P-TNO 248 | P-TNO 249 | P-TNO 250 | P-TNO 251 | 74 |
| Corresponding table designating data portion | | P-TNO 252 | P-TNO 253 | P-TNO 254 | P-TNO 255 | 75 |
| | | 00000000 | 00000000 | 00000000 | 00000000 | 76 |
| | | 00000000 | 00000000 | 00000000 | 00000000 | 77 |
| Management table (255 - parts table) | (01) | Start address | | | Track mode | 78 |
| Management table (255 - parts table) | | End address | | | Link information | 79 |
| Management table (255 - parts table) | (02) | Start address | | | Track mode | 80 |
| Management table (255 - parts table) | | End address | | | Link information | 81 |
| Management table (255 - parts table) | (03) | Start address | | | Track mode | 82 |
| Management table (255 - parts table) | | End address | | | Link information | 83 |
| | | | | | | |
| | | ... | | | ... | |
| | | | | | | |
| Management table (255 - parts table) | (FC) | Start address | | | Track mode | 580 |
| Management table (255 - parts table) | | End address | | | Link information | 581 |
| Management table (255 - parts table) | (FD) | Start address | | | Track mode | 582 |
| Management table (255 - parts table) | | End address | | | Link information | 583 |
| Management table (255 - parts table) | (FE) | Start address | | | Track mode | 584 |
| Management table (255 - parts table) | | End address | | | Link information | 585 |
| Management table (255 - parts table) | (FF) | Start address | | | Track mode | 586 |
| Management table (255 - parts table) | | End address | | | Link information | 587 |

U-TOC Sector 0

FIG. 13

Corresponding Table Designating Data Portion
(Table Pointers)

| | | |
|---|---|---|
| P-DFA:00h | P-EMPTY:(07h) | P-FRA:(06h) |
| P-TNO1:(01h) | P-TNO2:(02h) | P-TNO3:(04h) |
| P-TNO4:(05h) | P-TNO5:00h | P-TNO6:00h |
| P-TNO7:00h | P-TNO8:00h | P-TNO9:00h |
| | | |
| | | |
| P-TNO253:00h | P-TNO254:00h | P-TNO255:00h |

Management Table Portion (255 Parts Tables)

| | Start Address | End Address | Track Mode | Link Information |
|---|---|---|---|---|
| (01h) | $A_{20}$ | $A_{21}$ | | 00h |
| (02h) | $A_{22}$ | $A_{23}$ | | (03h) |
| (03h) | $A_{26}$ | $A_{27}$ | | 00h |
| (04h) | $A_{24}$ | $A_{25}$ | | 00h |
| (05h) | $A_{28}$ | $A_{29}$ | | 00h |
| (06h) | $A_{30}$ | $A_{31}$ | | 00h |
| (07h) | 00h | 00h | | 08h |
| (08h) | 00h | 00h | | 09h |
| (09h) | 00h | 00h | | 0Ah |
| (0Ah) | 00h | 00h | | (0Bh) |
| (0Bh) | 00h | 00h | | (0Ch) |
| | | | | |
| | | | | |
| (FEh) | 00h | 00h | | (FFh) |
| (FFh) | 00h | 00h | | 00h |

FIG. 14

Corresponding Table Designating Data Portion (Table Pointers)

| | | |
|---|---|---|
| P-DFA:00h | P-EMPTY:(08h) | P-FRA:(06h) |
| P-TNO1:(01h) | P-TNO2:(02h) | P-TNO3:(04h) |
| P-TNO4:(07h) | P-TNO5:(05h) | P-TNO6:00h |
| P-TNO7:00h | P-TNO8:00h | P-TNO9:00h |
| | | |
| | | |
| P-TNO253:00h | P-TNO254:00h | P-TNO255:00h |

Management Table Portion (255 Parts Tables)

| | Start Address | End Address | Track Mode | Link Information |
|---|---|---|---|---|
| (01h) | $A_{20}$ | $A_{21}$ | | 00h |
| (02h) | $A_{22}$ | $A_{23}$ | | (03h) |
| (03h) | $A_{26}$ | $A_{27}$ | | 00h |
| (04h) | $A_{24}$ | $A_{32}$ | | 00h |
| (05h) | $A_{28}$ | $A_{29}$ | | 00h |
| (06h) | $A_{30}$ | $A_{31}$ | | 00h |
| (07h) | $A_{33}$ | $A_{25}$ | | 00h |
| (08h) | 00h | 00h | | 09h |
| (09h) | 00h | 00h | | 0Ah |
| (0Ah) | 00h | 00h | | (0Bh) |
| (0Bh) | 00h | 00h | | (0Ch) |
| | | | | |
| | | | | |
| (FEh) | 00h | 00h | | (FFh) |
| (FFh) | 00h | 00h | | 00h |

FIG. 15

Corresponding Table Designating Data Portion
(Table Pointers)

| | | |
|---|---|---|
| P-DFA:00h | P-EMPTY:(08h) | P-FRA:(06h) |
| P-TNO1:(01h) | P-TNO2:(02h) | P-TNO3:(07h) |
| P-TNO4:(05h) | P-TNO5:00h | P-TNO6:00h |
| P-TNO7:00h | P-TNO8:00h | P-TNO9:00h |
| | | |
| | | |
| P-TNO253:00h | P-TNO254:00h | P-TNO255:00h |

Management Table Portion (255 Parts Tables)

| | Start Address | End Address | Track Mode | Link Information |
|---|---|---|---|---|
| (01h) | $A_{20}$ | $A_{21}$ | | 00h |
| (02h) | $A_{22}$ | $A_{23}$ | | (03h) |
| (03h) | $A_{26}$ | $A_{27}$ | | (04h) |
| (04h) | $A_{24}$ | $A_{32}$ | | 00h |
| (05h) | $A_{28}$ | $A_{29}$ | | 00h |
| (06h) | $A_{30}$ | $A_{31}$ | | 00h |
| (07h) | $A_{33}$ | $A_{25}$ | | 00h |
| (08h) | 00h | 00h | | (09h) |
| (09h) | 00h | 00h | | (0Ah) |
| (0Ah) | 00h | 00h | | (0Bh) |
| (0Bh) | 00h | 00h | | (0Ch) |
| | | | | |
| | | | | |
| (FEh) | 00h | 00h | | (FFh) |
| (FFh) | 00h | 00h | | 00h |

APPARATUS FOR RECORDING AND/OR REPRODUCING A RECORDING MEDIUM WITH EDITING FUNCTIONS

This is a continuation of application Ser. No. 08/411,745, filed May 15, 1995, now U.S. Pat. No. 5,724,322.

TECHNICAL FIELD

The present invention relates to an apparatus for recording and/or reproducing a recording medium. Particularly, the present invention relates to an apparatus for recording and reproducing a recording medium on which management information for recording or reproducing data is recorded together with data.

BACKGROUND ART

Recordable disk media, such as a magneto-optical disk or the like, can be accessed randomly with ease as compared with a tape-shaped recording medium, such as a DAT (Digital Audio Tape), a compact cassette tape or the like. Therefore, data need not be recorded from the inner peripheral side to the outer peripheral side of the disk in the correct order of a first track to an nth track. In other words, even when a piece of music is recorded on the disk at its physical random positions, if recorded address data of music recorded from the first to nth tracks are managed, then it is possible to reproduce music in the correct order.

Further, a track serving to record a piece of music need not always be recorded on consecutive segments (segment is referred to as a portion in which physically continuous data is recorded) and may be discretely divided into a plurality of segments and recorded on the disk.

In particular, in the system in which data read out from a magneto-optical disk is temporarily stored in a buffer memory at high transfer rate, read out from the buffer memory at a constant transfer rate and demodulated as an audio reproduced signal, even when reading of data from the magneto-optical disk is temporarily interrupted due to access between the segments, it is possible to continuously output the reproduced audio signal.

Accordingly, if recording and reproducing operation within the segment and high speed access operation, i.e., access operation which is ended within a reproducible time based on a data stored amount generated by a difference between a write data and a read rate of the buffer memory are repeated continuously, even when a track of a piece of music is physically divided into a plurality of segments, music can be recorded/reproduced satisfactorily.

As shown in FIG. 1, for example, although a first music is recorded as a segment $M_1$ and a second music is recorded as a segment $M_2$ continuously, it is possible to record fourth and fifth music separately on the disk as shown by segments $M_{4(1)}$ to $M_{4(4)}$ and $M_{5(1)}$ to $M_{5(2)}$. FIG. 1 is a schematic diagram and, in actual practice, it is frequently observed that one segment is recorded over several to several 100s of tracks or greater.

When music is recorded on and erased from the magneto-optical disk repeatedly, irregular empty regions occur on the track due to a difference between a playing time of recorded music and a playing time of erased music. However, if a discrete recording is executed as shown in FIG. 1, then it becomes possible to record music of which playing time is longer than that of the erased music by effectively using the erased portion. Therefore, it is possible to solve a problem of useless data recording area generated by repetitive recording/erasure. Incidently, recorded data is not limited to "music" and any kinds of audio signals may be recorded. In this specification, let it be assumed that music is recorded as data (tracks of continuous one unit.

Upon recording, a recording is made on this disk while accessing segments forming a plurality of non-recording regions. Upon reproduction, segments should be accessed such that a piece of music is reproduced correctly. To this end, segments of a piece of music, such as data connecting $M_{4(1)}$ to $M_{4(4)}$ and data indicative of the non-recording region are held as U-TOC (user TOC, hereinafter simply referred to as U-TOC) which is rewritten at each recording or erasing operation. Under the control, the recording/reproducing apparatus reads this U-TOC information and allows the head to access the tracks so as to perform proper recording/reproducing operation.

As described above, the disk is provided with the U-TOC in order to manage the address of the first to nth tracks and the non-recording regions and to manage the connection of segments in respective tracks and the non-recording region. In the system for checking this information, the recording/reproducing apparatus can easily execute edit, such as division and connection of tracks, by rewriting the U-TOC.

When the divide operation is carried out at the position of somewhere of the first music, for example, if the U-TOC is rewritten such that the address position is set to the end address of the first music and that the position of the end address of the first music from that position is managed as start address and end address of a resulting second music, then the original first music is divided into the first and second music at the position of somewhere of the first music.

When the combine operation is carried out at the boundary position of the first and second music, if the U-TOC is rewritten such that the start address of the first music and the end address of the second music are managed as start address and end address of a new first music, then the original first and second music are combined to provide a new first music.

In order to carry out the above-mentioned edit, the conventional disk recording and reproducing apparatus is provided with edit mode operation function in addition to the reproducing mode (operation mode, such as playback, playback pause, fast forward, fast rewind and access) and the recording mode (operation mode, such as recording and recording pause).

FIG. 2 shows an operation processing in the edit mode.

In a playback mode (F900), for example, if an edit key is operated (F901→YES), then operation in the edit mode is selected. If combine, divide and erase (function to rewrite U-TOC so as to erase a designated track) are entered and title input (processing for rewriting character data, such as music name and disk name corresponding to a designated track or disk on the U-TOC) is carried out as edit function, it is determined in steps F902, F903, F904 and F905 whether or not any processing is selected. Then, a combine processing (F906), a divide processing (F907), an erase processing (F908) and a title enter processing (F909) are executed.

However, even when the edit modes are prepared so that various kinds of edit processing and U-TOC edit processing can be carried out as described above, there is then the problem that it is not so easy for the user to use the edit function. In particular, the combine processing and the divide processing are not so easy to use.

In the divide processing in which a track number is incremented, for example, the divide processing should preferably be carried out by the user at any time in the recording or playback. Specifically, if the divide processing is carried out to input a track mark when a speaker is changed during contents of conference are recorded, the divide processing need not be carried out after the recording was ended and a desired speech can be readily accessed and played back upon reproduction. Similarly, when a radio broadcasting is recorded, if a track mark is immediately input with ease at the completion of music, then it is convenient for the user to access and reproduce the music upon playback. Further, it is convenient for the user if the user inputs a track mark to an arbitrary point during the playback while listening to reproduced music or if the user carries out the combine processing by using the track mark.

However, these processing are executed in the edit mode as described above and cannot be carried out with ease during the recording and playback.

In view of the aforesaid problem, according to the present invention, it becomes possible to execute the divide processing and the combine processing with ease.

DISCLOSURE OF INVENTION

The present invention relates to an apparatus for recording and/or reproducing a recording medium which is comprised of a recording and reproducing means for recording data or reproducing data on or from a recording medium in which management information for recording or reproducing data is recorded together with data, designating means for designating a breakpoint position of one data and control means for recognizing a timing point at which the designating means is operated as the breakpoint position when the designating means is operated during data recording or reproduction on or from the recording medium by the recording and reproducing means and controlling the recording and reproducing mean so as to rewrite management information.

Since a track mark can be entered or canceled by the designating means (track mark operating means) during the reproducing mode or recording mode, i.e., in the operation state, such as reproducing, recording, pause or the like, the divide edit and the combine edit become simple and easy to handle. Further, the divide edit and the combine edit become useful functions. Further, if the divide edit and the combine edit are effected in a remote control fashion by the designating means (track mark operating means) provided in a microphone, a headphone and a remote commander, the recording processing and the reproducing processing become easier and more useful.

BRIEF DESCRIPTION OF DRAWINGS

FIG. 9 is a diagram used to explain a P-TOC sector in a disk;

FIG. 10 is a diagram used to explain a U-TOC sector in the disk;

FIG. 13 is a diagram used to explain the management state by U-TOC;

FIG. 14 is a diagram used to explain U-TOC rewrite operation by the divide edit;

FIG. 15 is a diagram used to explain U-TOC rewrite operation by the combine edit;

BEST MODE FOR CARRYING OUT THE INVENTION

Figure 1:
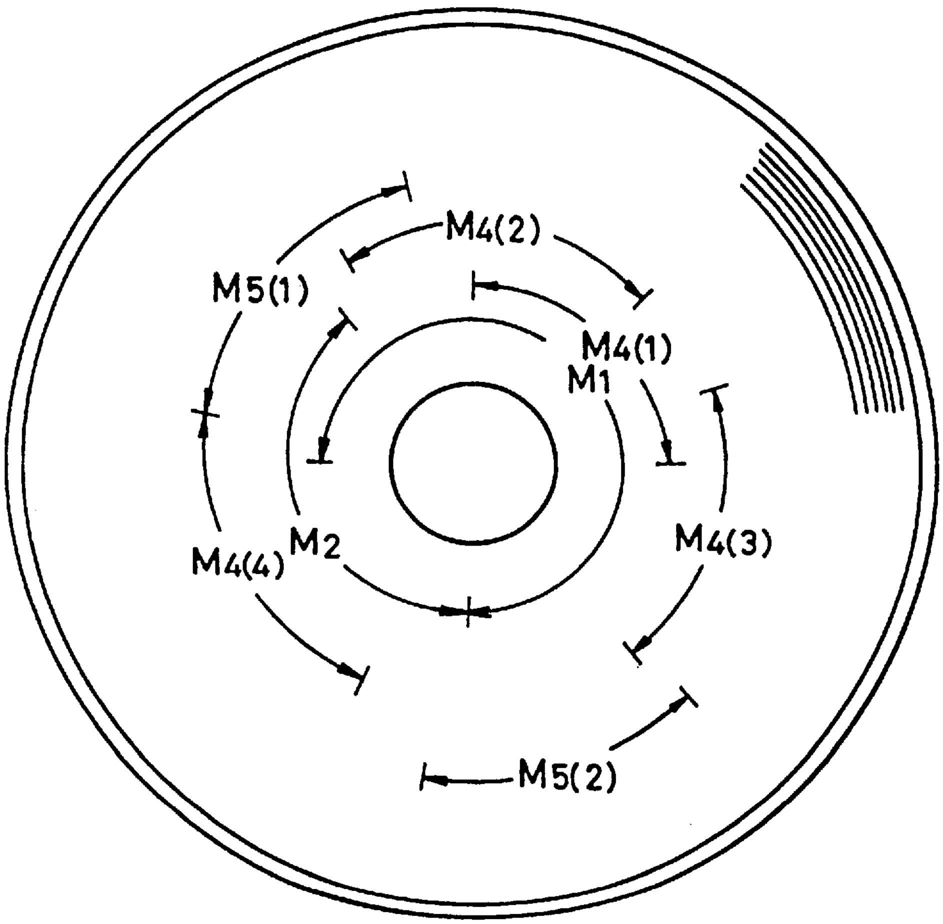
FIG. 1 is a diagram used to explain the recording state of a disk.
Figure 2:
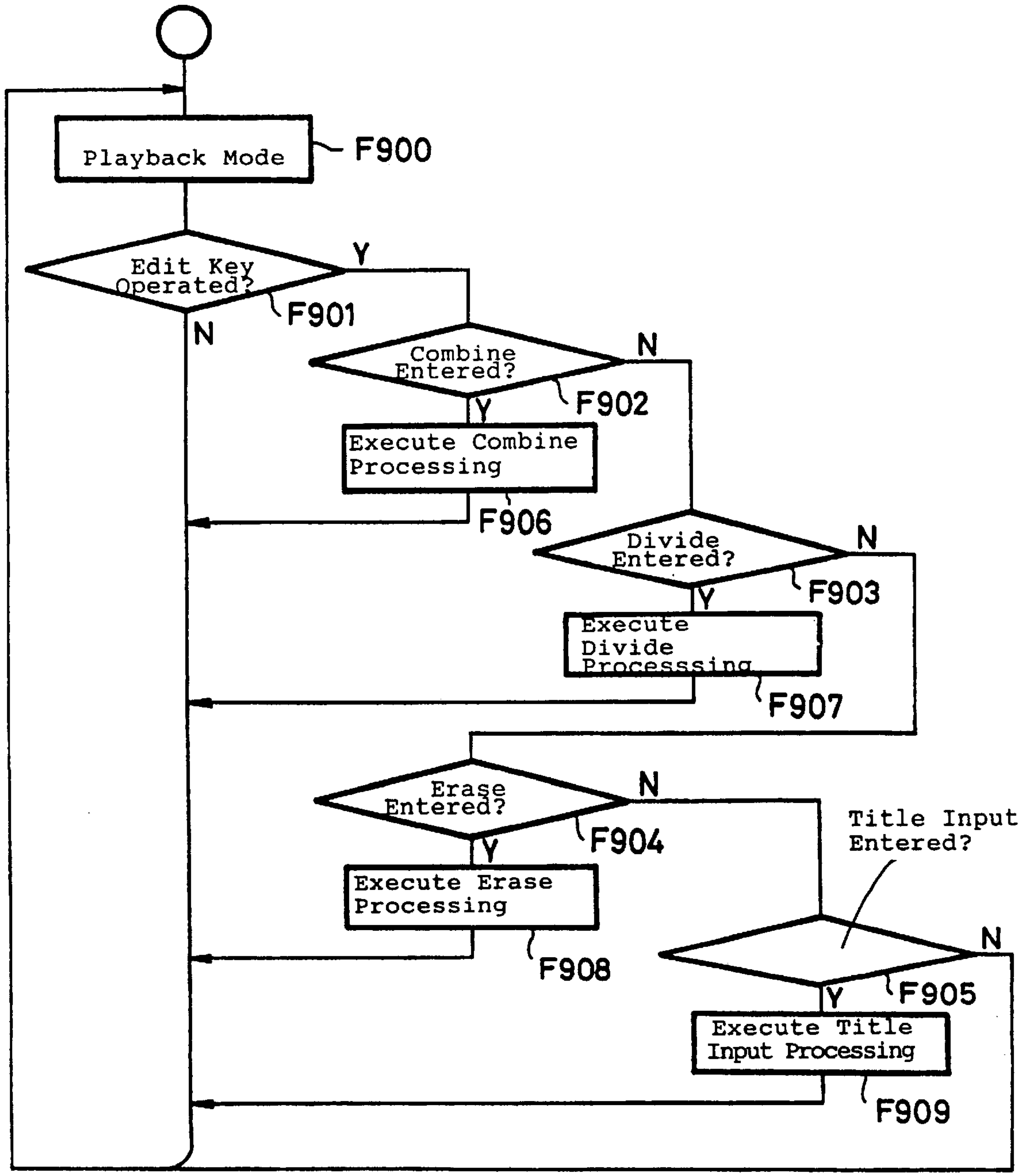
FIG. 2 is a flowchart of divide operation processing and combine operation processing.
Figures 3A, 3B, 3C, 3D:
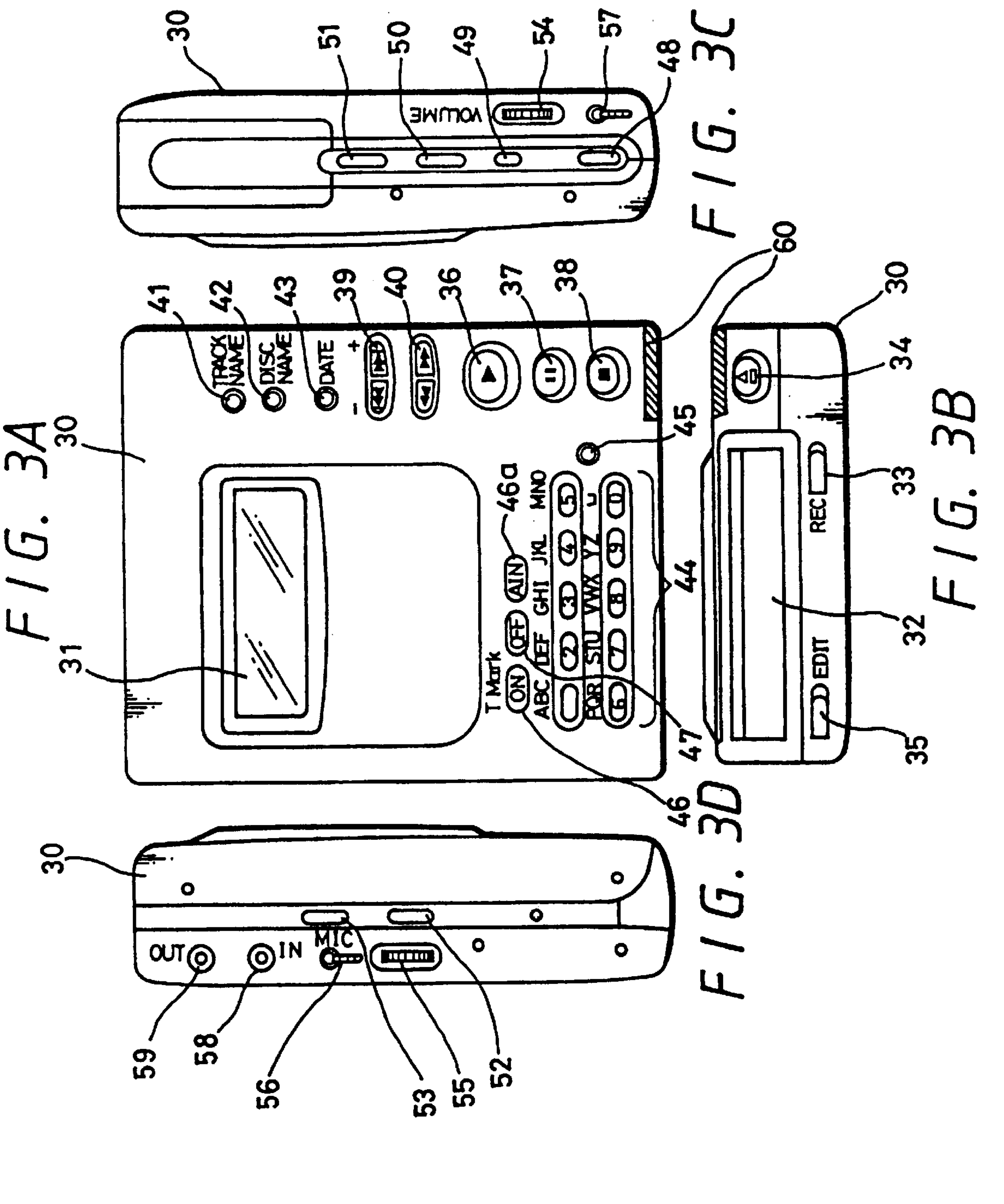
FIGS. 3A to 3D are a plan view, a front view, a right-hand side elevational view and a left-hand side elevational view of a recording and reproducing apparatus according to the present invention.

An apparatus for recording and/or reproducing a recording medium according to the embodiment will be described with reference to FIGS. 3 to 18. In the embodiment which follows, a recording and reproducing apparatus using a magneto-optical disk as a recording medium will be considered and described in the following order.

1. Arrangement of recording and reproducing apparatus
2. P-TOC
3. U-TOC
4. Area structure of disk
5. Divide and combine edit processings
6. Automatic track numbering mode setting processing
7. Processing used to record data input by microphone
8. Various automatic track numbering operations upon recording
9. System for using an automatic track numbering mode setting key also as a recording key (1. Arrangement of Recording and Reproducing Apparatus)

FIGS. 3A to 3D are a plan view, a front view, a right-hand side elevational view and a left-hand side elevational view each showing an outer face of a recording and reproducing apparatus.

Reference numeral 30 depicts a recording and reproducing apparatus body and reference numeral 31 depicts a display portion formed of a liquid crystal display, for example, on which there are displayed track number, playback time, recording/reproducing progress time, title characters, operation mode, recording/reproducing level and so on.

Reference numeral 32 depicts a disk insertion portion through which a magneto-optical disk accommodated in a disk cartridge is inserted and loaded on a recording/reproducing optical unit of the inside.

The recording and reproducing apparatus body 30 includes various kinds of operation keys serving as an operation input portion. The recording and reproducing apparatus includes a recording switch 33, an eject key 34 and an edit key 35 disposed on the front surface of its body.

The recording and reproducing apparatus includes a playback key 36, a temporary stop (pause) key 37, a stop key 38, a channel selection key 39, a search key 40, a broadcasting station name enter mode key 41, a disk name enter mode key 42, a date enter mode key 43, a ten-key pad 44 and an enter key 45 disposed on the upper surface of its body. Further, the recording and reproducing apparatus includes a mark-on key 46, a mark-off key 47 as track mark keys and an ATN key 46*a* for setting an automatic track numbering mode (referred to hereinafter as "ATN mode").

Numeral keys of the ten-key pad 44 includes corresponding three or two alphabets or spaces used to enter characters.

The recording and reproducing apparatus includes a hold switch 48, a play mode key 49 for selecting the repeat/random playback/program playback or the like, a low frequency band correction switch 50 and a resume switch 51 disposed on the right-hand side surface of its body. The recording and reproducing apparatus includes an AGC switch 52 and a microphone attenuator switch 53 disposed on the left-hand side surface of its body.

Further, reference numeral 54 depicts a volume and reference numeral 55 depicts a recording level adjustment volume.

The recording and reproducing apparatus further includes various kinds of input and output terminals disposed on the side surface of its body.

Figure 4:
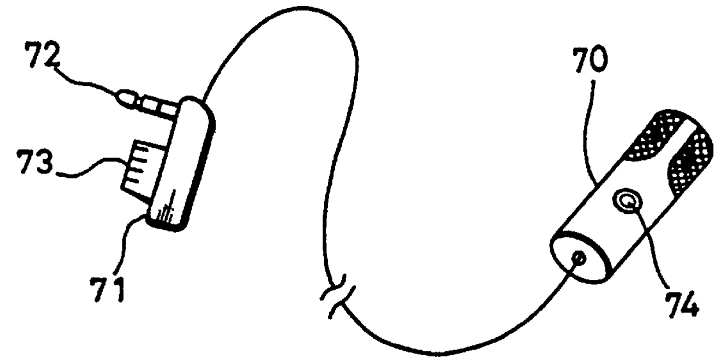
FIG. 4 is a plan view of a microphone used in the recording and reproducing apparatus according to the embodiment.

Reference numeral 56 depicts a microphone input terminal to which there is connected a microphone 70 shown in FIG. 4. A connection portion 71 of the microphone 70 is composed of a stereo plug portion 72 and a connector portion 73 as shown in FIG. 4. The microphone input terminal 56 is formed so as to be adapted to the connection portion 71. The microphone 70 includes a track mark key 74 formed on its housing. The connection portion 71 of the microphone 70 and the microphone input terminal 56 are not limited to the above-mentioned shapes and may be modified variously.

The microphone input terminal 56 to which the microphone 70 is connected includes a connection detection mechanism and a circuit, though not shown. A detected signal $D_{JM}$ from the detection circuit is supplied to a system controller 11. It is determined by the system controller 11 on the basis of the detected signal $D_{JM}$ whether or not the microphone 70 is connected to the microphone input terminal.

Figure 5:
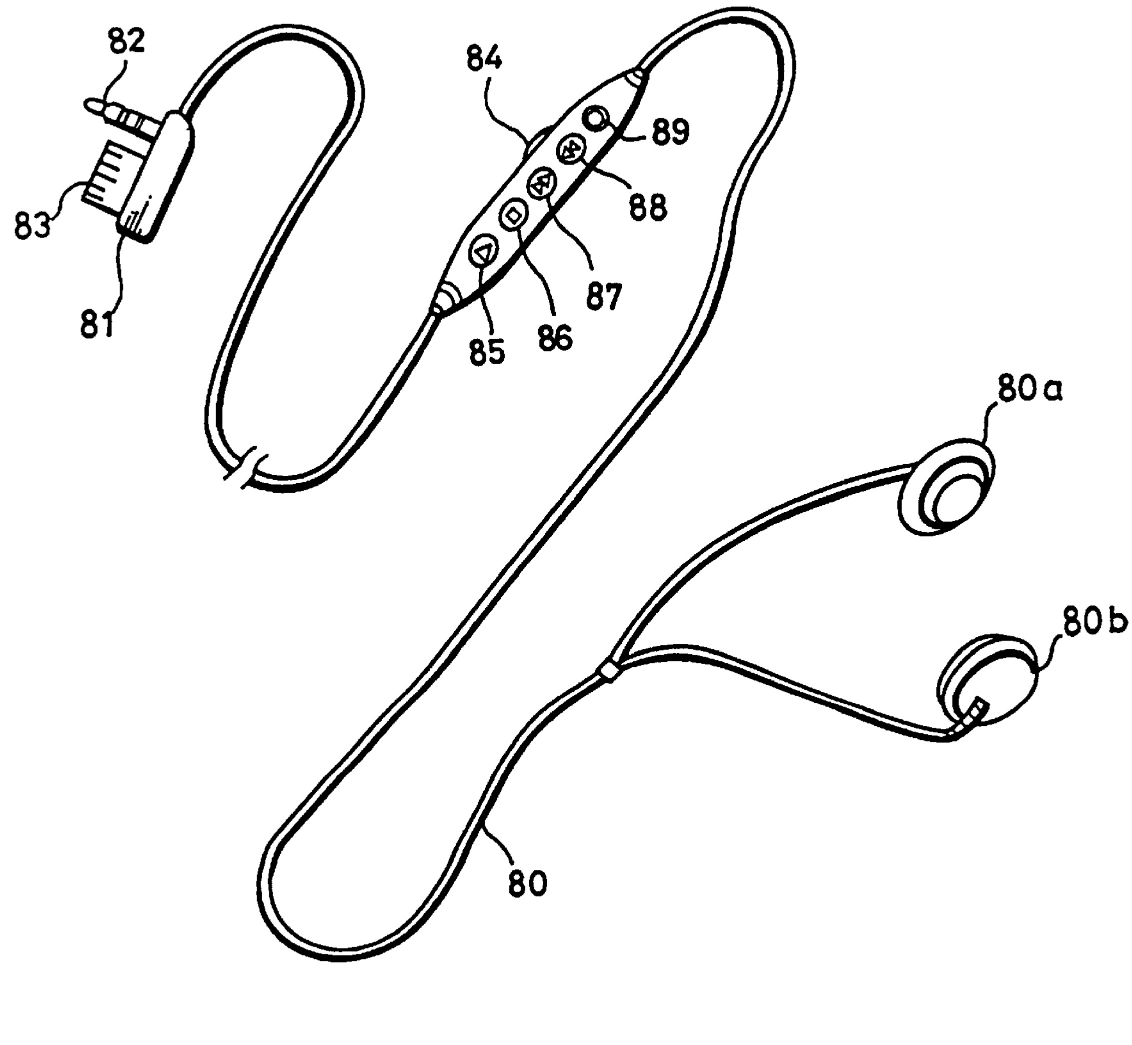
FIG. 5 is a diagram used to explain a headphone used in the recording and reproducing apparatus according to the embodiment.

Reference numeral 57 depicts a headphone output terminal to which there is connected a headphone 80 shown in FIG. 5. A connection portion 81 of the headphone 80 is composed of a stereo plug portion 82 and a connector portion 83 shown in FIG. 5. Accordingly, the headphone output terminal 57 is formed so as to be adapted to such connection portion 81. The headphone 80 has an operation portion formed in the intermediate portion of its cord. The operation portion of the headphone includes a volume 84 for adjusting the headphone output level, a playback key 85, a stop key 86, a feed forward/channel selection key 87 and a track mark key 87.

The connection portion 81 of the headphone 80 and the headphone output terminal 57 are not limited to the above-mentioned shapes and may be modified variously.

Reference numeral 58 depicts an input terminal which is served as both a digital audio signal input terminal based on optical cable and a line input terminal of an analog audio signal. A terminal mechanism for enabling the input terminal to be used as both the digital audio signal input terminal and the analog audio signal line input terminal will not be described. Reference numeral 59 depicts an output terminal which is used as both a digital audio signal output terminal based on an optical cable and an analog audio signal line output terminal. The input terminal 58 also includes a connection detection mechanism and a circuit, though not shown. A detected signal $D_{JL}$ from the detection circuit is supplied to the system controller 11. It is determined by the system controller 11 on the basis of the detected signal $D_{JL}$ whether the digital audio signal input terminal or the analog audio signal line input terminal is connected.

Figure 6:
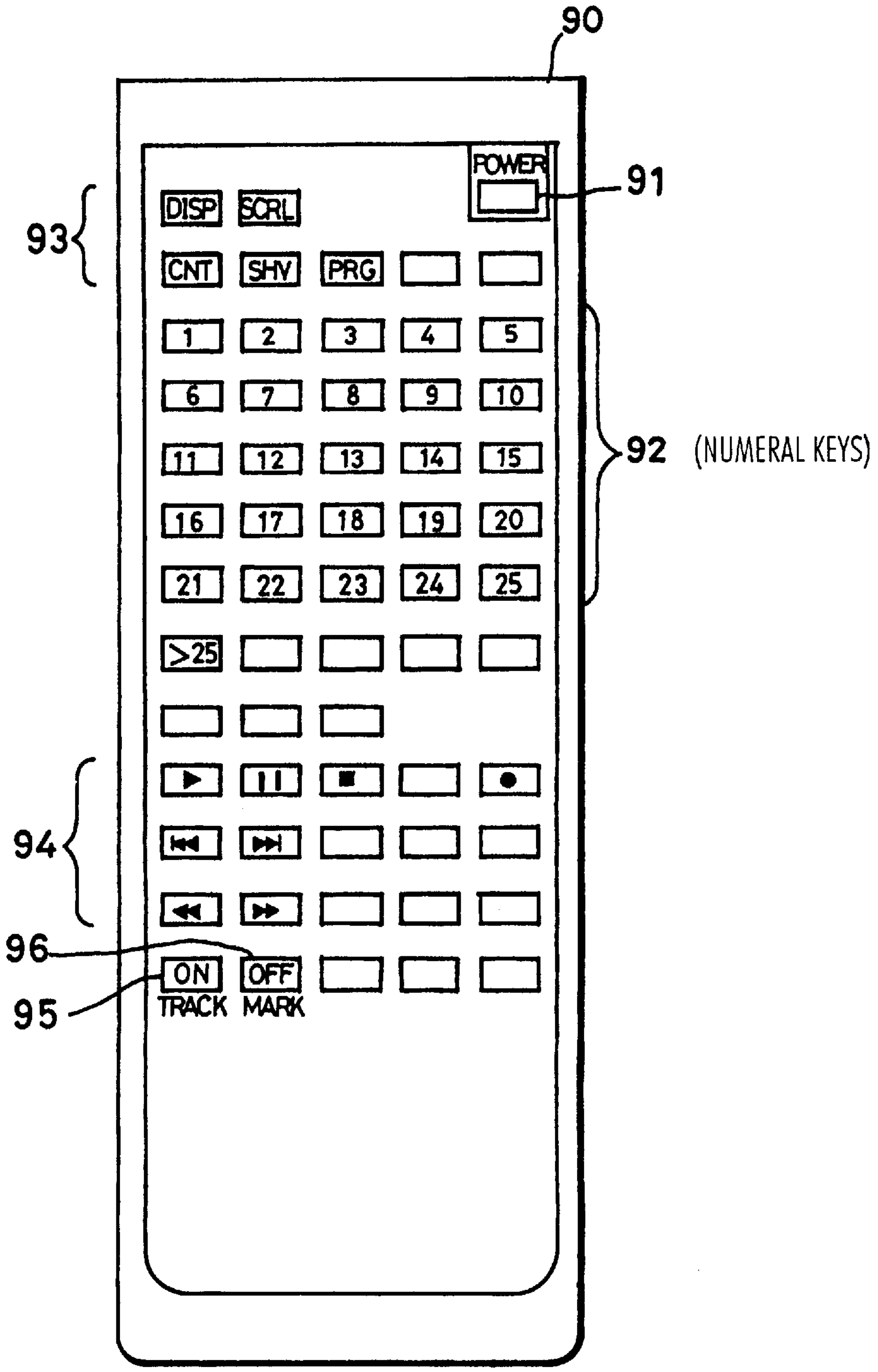
FIG. 6 is a plan view of a remote commander used in the recording and reproducing apparatus according to the embodiment.

The recording and reproducing apparatus includes an infrared photosensing portion 60. This photosensing portion 60 receives a command signal from a remote commander 90 which transmits a command signal via infrared rays as shown in FIG. 6.

The remote commander 90 includes a power key 91, numeral keys 92, various mode keys 93, record/playback operation keys 94 and a mark-on key 95 and a mark-off key 96 each serving as a track mark key. When these keys are depressed, a corresponding command signal is read out from an internal ROM or RAM, modulated in intensity by infrared rays and then output.

Figure 7:
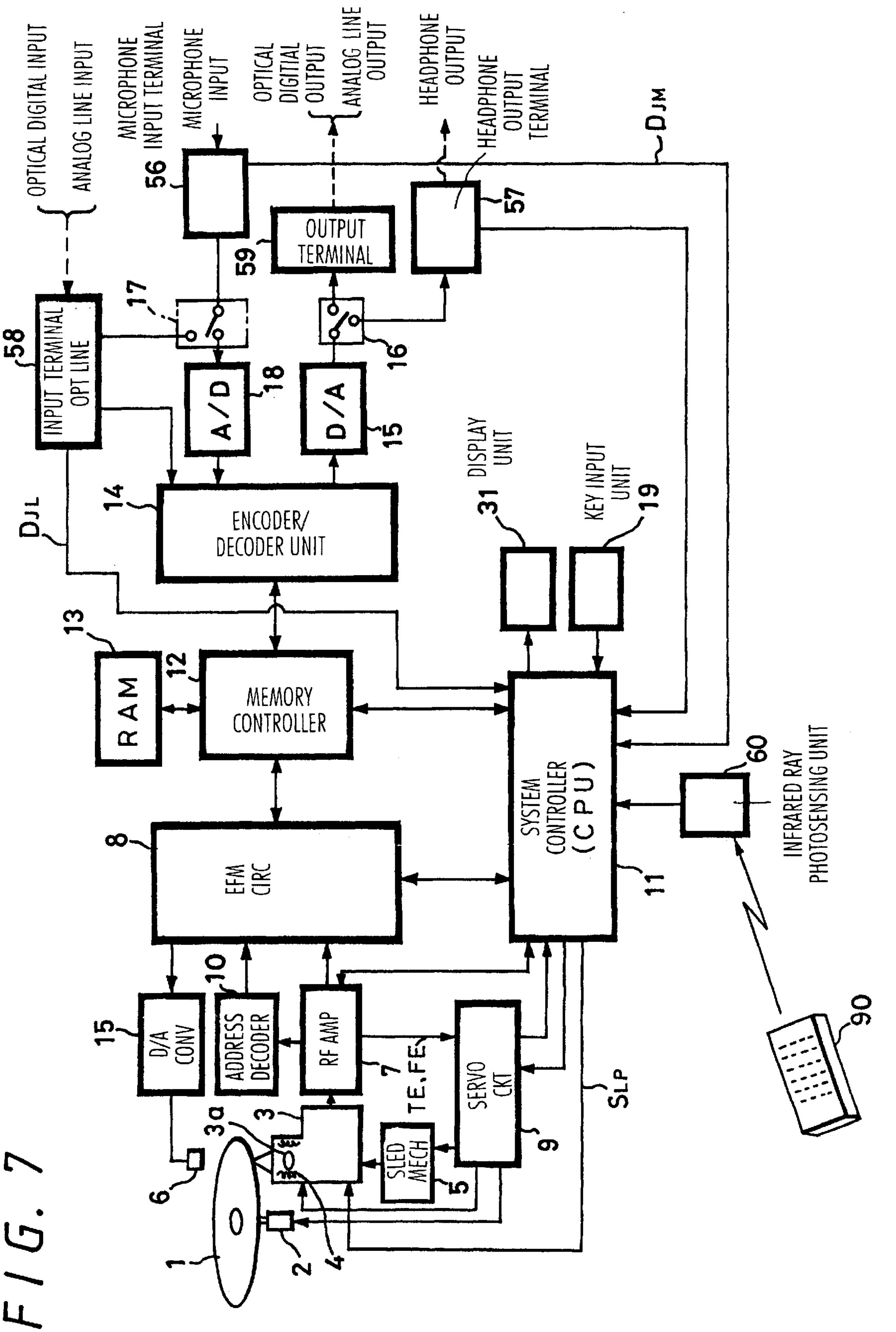
FIG. 7 is a block diagram of a main portion of the recording and reproducing apparatus according to the embodiment.

FIG. 7 is a block diagram showing a main portion of the inside of the recording and reproducing apparatus shown in FIGS. 3A through 3D.

In FIG. 1, reference numeral 1 depicts a magneto-optical disk in which audio data, for example, is recorded. This sheet of drawing schematically shows the state that the magneto-optical disk is loaded from the disk insertion portion 32. The magneto-optical disk 1 is rotated by a spindle motor 2. Reference numeral 3 depicts an optical head which radiates the magneto-optical disk 1 with laser beams upon recording/reproducing. The optical head 3 emits laser beam of high level to heat a recording track up to Curie temperature upon recording, and outputs laser beam of relatively low level to detect data from reflected light owing to Kerr effect upon playback.

To this end, the optical head 3 has a laser diode serving as a light source, an optical system composed of a polarization beam splitter, an objective lens or the like and a detector for detecting reflected light mounted thereon. An objective lens 3*a* is held by an actuator 4 so that it can be displaced in the disk radius direction and in the direction in which the objective lens is moved close to or away from the disk.

Reference numeral 6 depicts a magnetic head which applies vertical magnetic field modulated by data supplied thereto to the magneto-optical disk 1. The magnetic head is disposed at the position opposing the optical head 3 across the magneto-optical disk 1. The whole of the optical head 3 and the magnetic head 6 can be moved by a sled mechanism 5 in the disk radius direction.

Upon reproduction, information detected from the magneto-optical disk 1 by the optical head 3 is supplied to an RF amplifier 7. The RF amplifier 7 extracts a reproducing RF signal, a tracking error signal, a focusing error signal, absolute position information (absolute position information recorded on the magneto-optical disk 1 as pre-grooves (wobbling grooves)), address information, a focusing monitor signal or the like by calculating information supplied thereto. The reproducing RF signal thus extracted is supplied to an encoder/decoder unit 8. The tracking error signal and the focusing error signal are supplied to a servo circuit 9, and the address information is supplied to an address decoder 10. Further, the absolute position information and the focusing monitor signal are supplied to the system controller 11 formed of a microcomputer, for example.

The servo circuit 9 is responsive to the tracking error signal and the focusing error signal supplied thereto, track jump command and seek command supplied thereto from the system controller 11 and rotational speed detected information of the spindle motor 2 or the like to generate various kinds of servo drive signals. The various servo signals thus generated are supplied to the actuator 4 and the sled mechanism 5 to execute control, such as focus control and tracking control and also supplied to the spindle motor 2 so that the spindle motor 2 is controlled so as to rotate the magneto-optical disk in a constant angular velocity (CAV) fashion or in a constant linear velocity (CLV) fashion.

The reproducing RF signal is supplied to the encoder/decoder unit 8, in which it is processed by decode processing, such as EFM modulation, CIRC or the like and temporarily stored in the buffer memory 14 by a memory controller 12. Data is read out from the magneto-optical disk 1 by the optical head 3 and reproduced data is transferred in the system ranging from the optical head 3 to the buffer memory 14 at transfer rate of 1.4 Mbit/sec intermittently. The buffer memory 13 is formed of a RAM having a storage capacity of 1 Mbit or 4 Mbit.

Data written in the buffer memory 13 is read out from the buffer memory 13 at a timing in which a transfer rate of reproduced data becomes 0.3 Mbit/sec and then supplied to an encoder/decoder unit 14. Data supplied to the encoder/decoder unit 14 is processed by the encoder/decoder unit 14 in a reproduced signal processing fashion, such as decode processing effected on an audio signal compression or the like and thereby decoded to an output digital signal.

The digital signal output from the encoder/decoder unit 14 is converted to an analog signal by a D/A converter 15 and supplied through a switch 16 to the output terminal 59 or the headphone output terminal 57. Further, the digital signal is not converted to an analog signal but is directly supplied to the output terminal 59.

Specifically, when the headphone 80 is connected to the headphone output terminal 57, the audio signal that was converted to the analog audio signal is supplied to the headphone 80. When a connection cord (e.g., cord with a pin plug) is connected to the output terminal 59, the audio signal that was converted into the analog audio signal is supplied to other audio device via the connection cord.

When an audio cable is connected to the output terminal 59, the audio signal is supplied to other device as digital-data.

Writing/reading of data in and from the buffer memory 13 are carried out by designating address data under the control of a write pointer and a read pointer by the memory controller 12. The write pointer (write address data) is incremented at the timing of 1.41 Mbit/sec and the read pointer (read address data) is incremented at the timing of 0.3 Mbit/sec. Therefore, data of a certain data amount are stored in the buffer memory by a difference between the write and read bit rates. When data is stored in the buffer memory 13 to the full of the storage capacity, the increment of the write pointer is stopped and the read operation for reading data from the magneto-optical disk 1 by the optical head 3 also is stopped. However, since the increment of the read pointer R is continuously executed, reproduced signals output from the respective output terminals are avoided from being interrupted.

Thereafter, if only the read operation for reading data from the buffer memory 13 is continued so that the data storage amount within the buffer memory 13 becomes a predetermined amount or smaller at a certain timing point, then the optical head 3 resumes reading data and the increment of write pointer is resumed, thereby data being stored in the buffer memory 13.

Since the reproduced signal is output through the buffer memory 13 as described above, even when a tracking servo is disabled by a disturbance or the like, it is possible to prevent the reproduced signal from being interrupted. Specifically, if the reading operation for reading data is resumed by accessing the magneto-optical disk 1 up to its correct scanning position before the memory 13 becomes empty, then it is possible to continue the operation without affecting the output of the reproduced signal. In other words, it is possible to considerably improve a vibration service function.

In FIG. 7, address information output from the address decoder 10 and subcode data for control operation are supplied through the encoder/decoder unit 8 to the system controller 11, in which they are used in various kinds of control operations.

Further, a lock detection signal from a PLL circuit which generates a recording/reproducing operation bit clock and a monitor signal representing a dropped state of a frame sync signal of reproduced data (L channel and R channel) are supplied to the system controller 11.

The system controller 11 generates an output control signal $S_{LP}$ which controls the operation of the laser diode of the optical head 3. Therefore, the system controller 11 supplies the output control signal $S_{LP}$ to the laser diode to turn on and off the laser diode. When the laser diode is turned on by the output control signal, the system controller 11 switches an output produced in the reproduction where the output level of the laser beam is relatively low and an output produced in the recording where the output level of the laser beam is relatively high.

When the recording operation is executed on the magneto-optical disk 1, the analog or digital audio signal is supplied from other device through the connection cord or the audio optical cable connected to the input terminal 58. Moreover, the microphone 70 is connected to the microphone input terminal 56 to supply the audio signal as the output signal of the microphone 70.

The audio signal that was transmitted to the input terminal 58 in the form of the digital data through the audio optical cable is directly supplied to the encoder/decoder unit 14. The analog audio signal input to the microphone 70 via the connection cord or the microphone 70 is supplied through aa switch 17 to the A/D converter 18, in which it is converted to a digital signal and supplied to the encoder/decoder unit 14.

The encoder/decoder unit 14 processes the input digital signal in an audio compression encode processing. The digital data compressed by the encoder/decoder unit 14 is temporarily stored in the buffer memory 13 under the control of the memory controller 12 and read out from the buffer memory at a predetermined timing and sent to the encoder/decoder unit 8. The digital data supplied to the encoder/decoder unit 8 is processed by the encoder/decoder unit 8 in an encode processing fashion, such as CIRC encoding, EFM modulation or the like. Recorded data output from the encoder/decoder unit 8 is supplied to a magnetic head drive circuit 15.

The magnetic head drive circuit 15 supplies a magnetic head drive signal to the magnetic head 6 based on recorded data encoded by the encoder/decoder unit 8. Specifically, N or S vertical magnetic field generated by the magnetic head 6 is applied-to the magneto-optical disk 1. At that time, the system controller 11 supplies the output control signal $S_{LP}$ to the optical head 3 so that the optical head 3 outputs the laser beam of which the intensity corresponds to the recording level.

Reference numeral 19 depicts an operation input unit having keys operable by the user. The switches or keys 33 to 53 are those keys.

The microphone connected as described above include the tracking mark key 74. Operation information of this tracking mark key is obtained from the connector portion 73 of the connection portion 74 and the system controller 11 can detect operation information from the microphone input terminal 56.

Similarly, the headphone 80 also includes operation keys 85 to 89. Operation information for these operation keys can be obtained from the connector portion 83 of the connection portion 81 and the system controller 11 can detect operation information from the headphone output terminal 57.

To detect operation information by the operation keys of the microphone 70 and the headphone will be described below, in which case the headphone 80 is considered by way of example.

Figure 8:
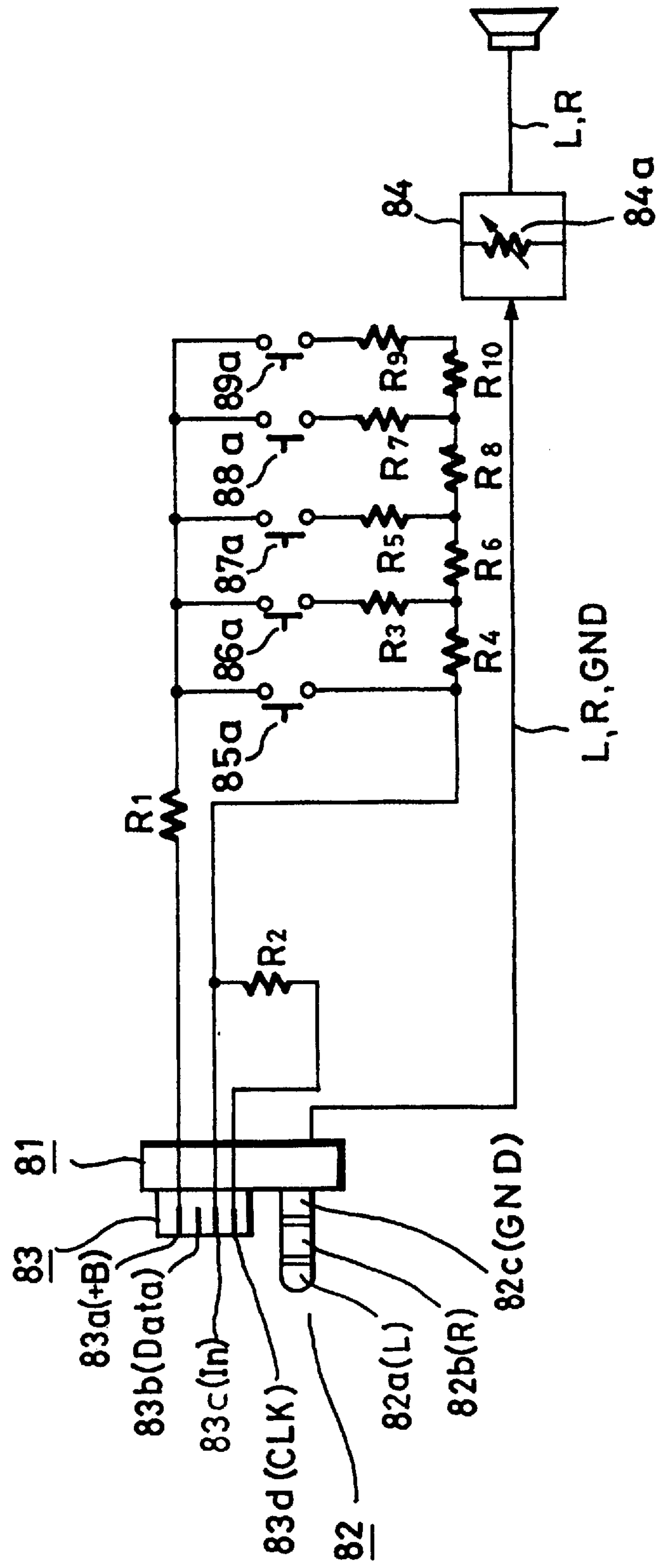
FIG. 8 is a diagram of an inside circuit of the headphone used in the recording and reproducing apparatus according to the embodiment.

FIG. 8 shows an example of a circuit configuration of the headphone 80.

The connection portion 81 includes the stereo plug 82 and the connector portion 83. In the stereo plug 82, a terminal 82*a* is an L-channel audio signal terminal, a terminal 82*b* is an R-channel audio signal terminal and a terminal 82*c* is grounded.

L-channel and R-channel audio signals supplied to the stereo plug portion 82 connected to the headphone output terminal 57 of the recording and reproducing apparatus are supplied through a variable resistor 84*a*, which can be varied by the volume 84, to ear speaker units 80*a*, 80*b* from which they are emanated as sounds.

On the other hand, in the connector portion 83, a terminal 83*a* is a terminal to which a positive voltage +B is applied. A terminal 83*b* is a data terminal, a terminal 83*c* is an input terminal and a terminal 83*d* is a clock terminal.

The positive voltage +B from the terminal 83*a* is supplied through a resistor $R_1$ to a contact 85*a* of the playback key 85, a contact 86*a* of the stop key 86, a contact 87*a* of a fast forward/AMS KEY 87, a contact 88*a* of a fast rewind/AMS key 88 and a contact 89*a* of a track mark key 89.

The other terminal of the contact 85*a* is connected to the direct input terminal 83*c* and the other terminal of the contact 86*a* is connected through resistors $R_3$ and $R_4$ to the input terminal 83*c*. The other terminal of the contact 87*a* is connected through resistors $R_4$, $R_5$, $R_6$ to the input terminal 83*c*, and the other terminal of the contact 88*a* is connected through resistors $R_4$, $R_6$, $R_7$, $R_8$ to the input terminal 83*c*. Further, the other terminal of the contact 89*a* is connected through resistors $R_4$, $R_6$, $R_8$, $R_9$, $R_{10}$ to the input terminal 83*c*.

Specifically, each time any of the contacts 85*a*, 86*a*, 87*a*, 88*a* and 89*a* is turned on, voltage-dividing ratios of the respective resistors $R_1$ to $R_{10}$ and $R_2$ become different. As a consequence, the input terminal 83*c* is supplied with different voltage values each time any one of the play key 85, the stop key 86, the fast forward/AMS key 87, the fast rewind/AMS key 88 and the track mark key 89 is operated.

Therefore, on the system controller 11 side of the recording and reproducing apparatus, if the voltage value in the input terminal 83*c* is detected, then it is possible to judge operated contents of the keys 85 to 89 in the headphone 80. The system controller 11 carries out playback, stop or the like on the basis of the judged result.

The operation of the microphone 70 is fundamentally similar. Thus, if the voltage state presented by divided voltages is changed by operating the track mark key 74, then it is possible to detect the operation by the system controller 11.

Moreover, as shown in FIG. 7, the infrared photosensing portion 60 receives the command signal from the remote commander 90. Then, the infrared photosensing portion 60 photoelectrically converts the received command signal to an electrical signal and supplies the electrical signal to the system controller 11. The system controller 11 performs various processings based on the command pulse supplied thereto to thereby make it possible for the remote commander 90 to perform a remote operation.

When data is recorded/reproduced on and from the disk 1, management information recorded on the disk 1, i.e., P-TOC (pre-mastered TOC), U-TOC are read out. Then, the system controller 11 judges address data of segments to be recorded on the disk 1 and address data of segment to be reproduced from the disk on the basis of these management informations. The management information is stored in the buffer memory 13. To this end, the buffer memory 13 has an area to store recorded or reproduced digital data and an area to hold these management information set therein.

When the disk 1 is loaded on the recording and reproducing apparatus, the system controller 11 moves the optical head 3 toward the innermost periphery of the disk to enable the optical head 3 to read out these management informations. The management informations thus read out are stored in the buffer memory 13. Thereafter, when data is recorded/reproduced on and from the disk 1, the system controller reads out the management informations from the buffer memory 13 and use the same to effect various control operations.

The U-TOC is edited and rewritten each time data is recorded or erased. The system controller 11 effects the U-TOC edit processing on the U-TOC information stored in the buffer memory 13 each time data is recorded/erased on and from the disk, and rewrites the U-TOC area of the disk 1 at a predetermined timing in response to the rewrite operation.

(2. P-TOC)

As management information for managing recording/reproducing operation of audio data sector and audio data recorded in the form of sector data on the disk 1, P-TOC will be described initially.

As P-TOC information, an area such as a disk recordable area (referred to hereinafter as "recordable user area") is designated and a U-TOC area is managed. If the disk 1 is a preformatted optical disk, it is possible to manage music that were recorded on the disk 1 in the form such that music cannot be rewritten by the P-TOC.

FIG. 9 shows a P-TOC format.

FIG. 9 shows one sector (sector 0) of P-TOC information repeatedly recorded on a P-TOC area (e.g., ROM area formed on the innermost peripheral side of the disk). According to the P-TOC format, sectors following a sector 1 may be provided optionally when necessary. The ROM area in this specification depicts a recording area in which data cannot be rewritten and in which data is recorded in the form of concavities and convexities, such as pits of the compact disk, for example.

Data area (4 bytes×588=2352 bytes) of the P-TOC sector includes a header composed of 4 bytes of a sync pattern of one-byte data of all "0" or all "1", cluster address data and sector address data to indicate the P-TOC area.

The header is followed by identification code data ID called "MINI" disposed at a predetermined address position according to the ASCII code corresponding to characters.

The identification code data ID is followed by disk type data, recording power data, tune number data of first recorded music (First TNO), tune number data of last recorded music (Last TNO), read-out start address $RO_A$, a power calculation start address $PC_A$ for adjusting power level of laser beam from the optical head, start address $UST_A$ of U-TOC (data area of U-TOC sector 0 in FIG. 10 which will be described later on) and recordable user area start address $RST_A$.

There is prepared a corresponding table designating data portion including table pointers (P-TNO1 to P-TNO 255) by which recorded music and so on are agreed with parts table in a management table portion which will be described later.

In the area which follows the corresponding table designating data portion, there is prepared the management table portion in which 255 parts tables ranging from (01h) to (FFh) are provided in correspondence with the table pointers (p-TNO1 to P-TNO255) in the corresponding table designating data portion. In this specification, numerical values affixed by "h" represent so-called hexadecimal notations. In each of the parts tables, there can be recorded a start address which becomes a start point of a certain segment, an end address which becomes an end point and mode information (track mode) of the segment (track).

The track mode information in each parts table contains information representing whether the segment is set in the overwrite inhibit segment or data copy inhibit segment, whether the track mode information is audio information or whether the track mode information is monaural/stereo information.

In the respective parts tables from (01h) to (FFh) in the management table portion, the contents of segments are indicated by table pointers (P-TNO1 to P-TNO255) of the corresponding table designating portion. In other words, with respect to the music of the first program, there is recorded a certain parts table of the table pointer P-TNO1 (e.g., (01h), in actual practice, numerical value that can indicate a certain parts table at the byte position within the P-TOC sector 0 is recorded on the table pointer by predetermined calculation). In this case, the start address of the parts table (01h) becomes the start address of the recording position of the music of the first program. Similarly, the end address becomes the end address of the position at which the music of the first program is recorded. Further, the track mode information becomes information concerning the first program.

Similarly, with respect to the second program, the start address, the end address and the track mode information of the recording position of the second program are recorded on the parts table (e.g., (02h)) indicated on the table pointer P-TNO2.

In a like manner, since there are prepared the table pointers up to P-TNO255, programs up to 255th program can be managed on the P-TOC.

Then, since the P-TOC sector 0 is formed, upon reproduction, a predetermined music can be accessed and reproduced.

In the case of the recordable/reproducible magneto-optical disk, information is recorded by physical concavity and convexity, i.e, so-called pits of compact disk and there is no ROM area. Therefore, the corresponding table designating data portion and the management table portion are not used and respective bytes are all set to "00h". These are managed by U-TOC which will be described later on.

However, with respect to the preformatted optical disk in which all music are recorded by so-called pits and a hybrid type optical disk having both the ROM area in which music and so on are recorded and a magneto-optical area, there are used the corresponding table designating data portion and the management table portion in order to manage music in the ROM area.

(3. U-TOC)

U-TOC will be described next.

FIG. 10 shows a format of one sector (sector 0) of the U-TOC which is set to a data area in which there is recorded management information concerning a non-recording area (hereinafter referred to as "free area") in which a piece of music recorded by the user and new music can be recorded. The sector 1 and the following sectors of the U-TOC are made optional.

When a certain music is recorded on a disk 1, for example, the system controller 11 searches a free area on the disk from the U-TOC and recording data is recorded on the searched free area under the control of the system controller. Upon reproduction, the system controller 11 discriminates the area in which a reproduced music is recorded from the U-TOC and carries out the reproducing operation by accessing that area.

The sector (sector 0) of the U-TOC shown in FIG. 10 includes a header similarly to the P-TOC and data, such as maker code, model code, program of first music (First TNO0, program of last music (Last TNO), sector use situation, disk serial No. and disk ID recorded at predetermined address positions. Further, the U-TOC includes various kinds of table pointers (P-DFA, P-EMPTY, P-FRA, P-TNO1 to P-TNO255) prepared as corresponding table designating portions in order to discriminate the area of music recorded by the user recording and the non-recording area with reference to the management table which will be described later on.

There are provided 255 parts tables from (01h) to (FFh) as the management portions which are made corresponding to that table pointers (P-DFA to P-TNO255) of the corresponding table designating data portion. Similarly to the P-TOC sector 0 of FIG. 9, a start address which becomes a start of a certain segment, an end address which becomes an end of a certain segment and mode information (track mode) of the segment are recorded on the respective parts table. Further, in the case of this U-TOC sector 0, segments indicated by the respective parts table are frequently combined with other segments so that link information indicating the parts table in which the start address and the end address of the combined segment are recorded can be recorded.

This kind of recording and reproducing apparatus can satisfactorily reproduce data by accessing several segments without trouble even when data of a piece of music is recorded over a plurality of segments. Thus, it is frequently observed that music that are recorded by the user is recorded over a plurality of segments in order to enhance an efficiency with which recordable areas can be used. To this end, the U-TOC includes link information in which parts tables can be combined by designating combined parts tables with numbers (01h) to (FFh) (in actual practice, indicated by numerical values set to byte positions within the U-TOC by predetermined calculation) given to the respective parts tables. Incidentally, since a piece of music recorded in the form of pits in advance is not generally divided in segment, as shown in FIG. 9, link informations are all set to "00h" in the P-TOC sector 0.

In other words, in the management table portion in the U-TOC sector 0, one parts table expresses one segment. Therefore, with respect to a piece of music arranged by combining three segments, for example, its segment position is managed by the three parts tables combined by the link information.

With respect to the respective parts tables up to (01h) to (FFh) in the management table portion of the U-TOC sector 0, contents of segments are indicated by the table pointers (P-DFA, P-EMPTY, P-FRA, P-TNO1 to P-TNO255) in the corresponding table designating data portion as follows:

The table pointer P-DFA indicates a defect area on the magneto-optical disk 1 and designates one parts table or a starting parts table of a plurality of parts table which shows a track portion (=segment) which becomes a defect area due to scratches or the like. That is, if there exists a defect segment, any one of (01h) to (FFh) is recorded on the table pointer P-DFA and the defect segment is indicated on the corresponding parts table by the start and end addresses. If then there exist other defect segments, other parts table are designated as link information on the parts table and the defect segment is indicated on that parts table. If there is no other defect segment, the link information is set to "(00h)" which indicates the absence of defect segment to be linked.

The table pointer P-EMPTY occupies the starting parts table of the one or a plurality of empty parts tables in the management table portion. If there exists the empty parts table, any one of (01h) to (FFh) is recorded as the table pointer P-EMPTY. If there exist a plurality of empty parts tables, parts tables are sequentially designated from the parts tables designated by the table pointer P-EMPTY by link information. All empty parts tables are combined on the management table portion.

The table pointer P-FRA indicates a free area (including an erasing area) in which data can be written on the magneto-optical disk 1 and designates a starting parts table of one or a plurality of parts tables indicated by the track portion (=segment) which becomes a free area. In other words, if there exists the free area, any one of (01h) to (FFh) is recorded on the table pointer P-FRA and the segment which is the free area is indicated on the corresponding parts table by the start and end addresses. If there are a plurality of such segments, i.e., parts tables, then link informations are sequentially designated up to the parts table which becomes "(00h)".

Figure 11:
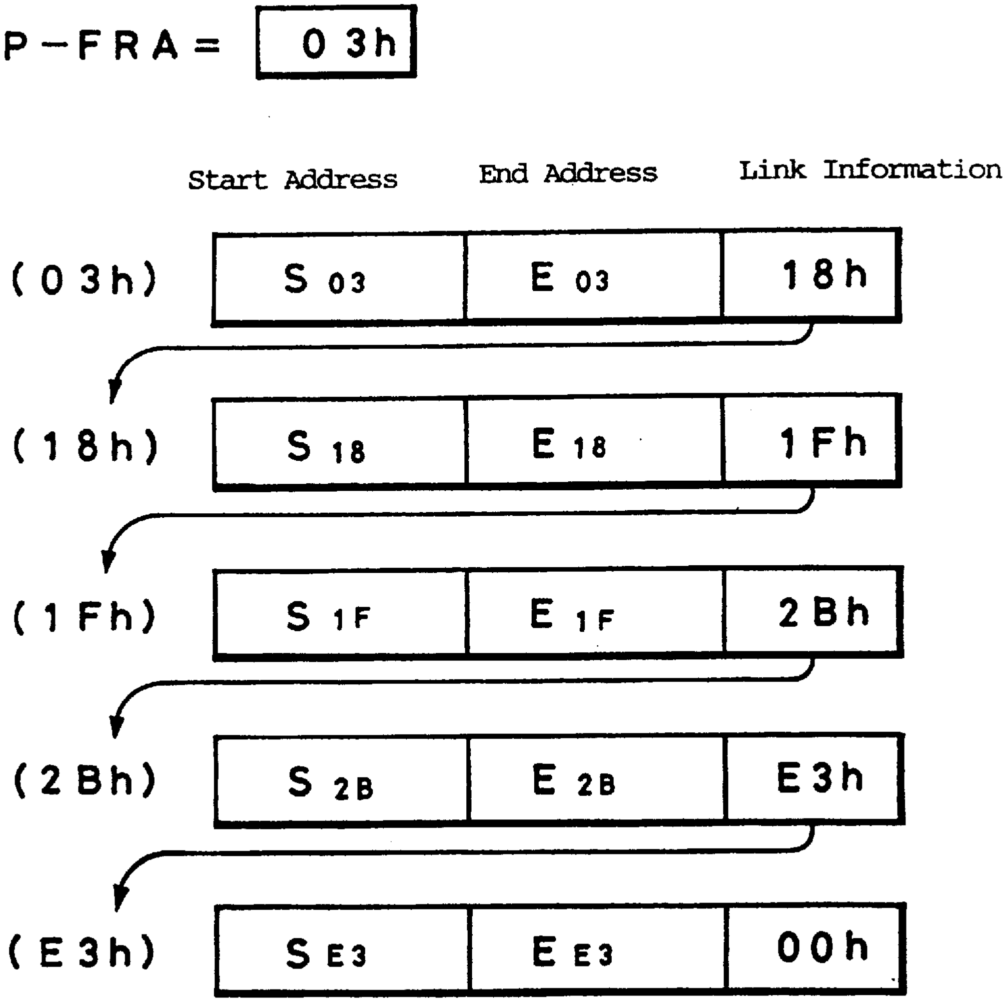
FIG. 11 is a diagram used to explain a link structure of the U-TOC sector in the disk.

FIG. 11 schematically shows a management state of the segment which becomes the free area. This diagram shows the state that when the segments (03h), (18h), (1Fh), (2Bh) and (E3h) are set to the free areas, this state is expressed by the linking of the parts tables (03h), (18h), (1Fh), (2Bh) and (E3h) following the corresponding table designating data P-FRA. The management states of the defect area and the empty parts tables become similar.

If the magneto-optical disk is such one that audio data such as music is not recorded at all and no defect area exists, then the parts table (01h) is designated by the table pointer P-FRA, whereby it is indicated that the whole of the recordable user area of the disk is the free area. In this case, since the parts tables (02h) to (FFh) are not used, the parts table (02h) is designated by the table pointer P-EMPTY. Also, the parts table (03h) is designated as link information of the parts table (02h) and the parts table (04h) is designated as link information of the parts table (03h), thereby parts tables being linked up to the parts table (FFh). In this case, the link information of the parts table (FFh) is set to "(00h)" which indicates the absence of the following linking of the parts tables.

At that time, with respect to the parts table (01h), the start address of the recordable user area is recorded as the start address, and an address immediately preceding the read-out start address is recorded as the end address.

The table pointers P-TNO1 to P-TNO255 indicate music that are recorded on the magneto-optical disk 1 by the user. The table pointer P-TNO1 designates the parts table in which a starting segment of one or a plurality of segments which data of first program is recorded is indicated.

When a piece of music serving as a first program is not divided on the disk, i.e., recorded on the disk as one segment, the recording area of the first program is recorded as the start and end addresses of the parts table indicated by the table pointer P-TNO1.

When a piece of music serving as a second program is recorded on a plurality of segments on the disk in a discrete fashion, segments are designated in the sequential order from a timing standpoint in order to indicate the recorded position of the music. In other words, other parts tables are designated by the link information from the parts table designated on the table pointer P-TNO2 in the sequential order from a timing standpoint and linked to the parts table in which link information becomes "(00h)" (in the form similar to that of FIG. 11). Data constructing the second program, for example, is recorded and all segments are sequentially designated and recorded as described above. As a result, when the second program is reproduced or data is overwritten on the area of the second program by using data of the U-TOC sector 0, it becomes possible to reproduce continuous music information from discrete segments by making the optical head 3 and the magnetic head 6 access the tracks or to effect the efficient recording by using the recording area.

As described above, the area management on the disk is carried out by the P-TOC and by the U-TOC such as the music recorded on the recordable user area and the free area.

These TOC informations are read in the buffer memory 13 and the system controller 11 can refer to these information. Incidentally, the number of tracks or the number of music that the U-TOC can manage becomes 255 at maximum. This is because the number of tracks or the number of music depends on the table pointers P-TNO1 to P-TNO255. If there exists a track in which two parts tables or more are linked from one table pointer P-TNO, then the number of parts tables is 255 and the number of tracks that can be managed by the U-TOC becomes less than 255.

(4. Area Structure of Disk)

Figures 12A, 12B, 12C:
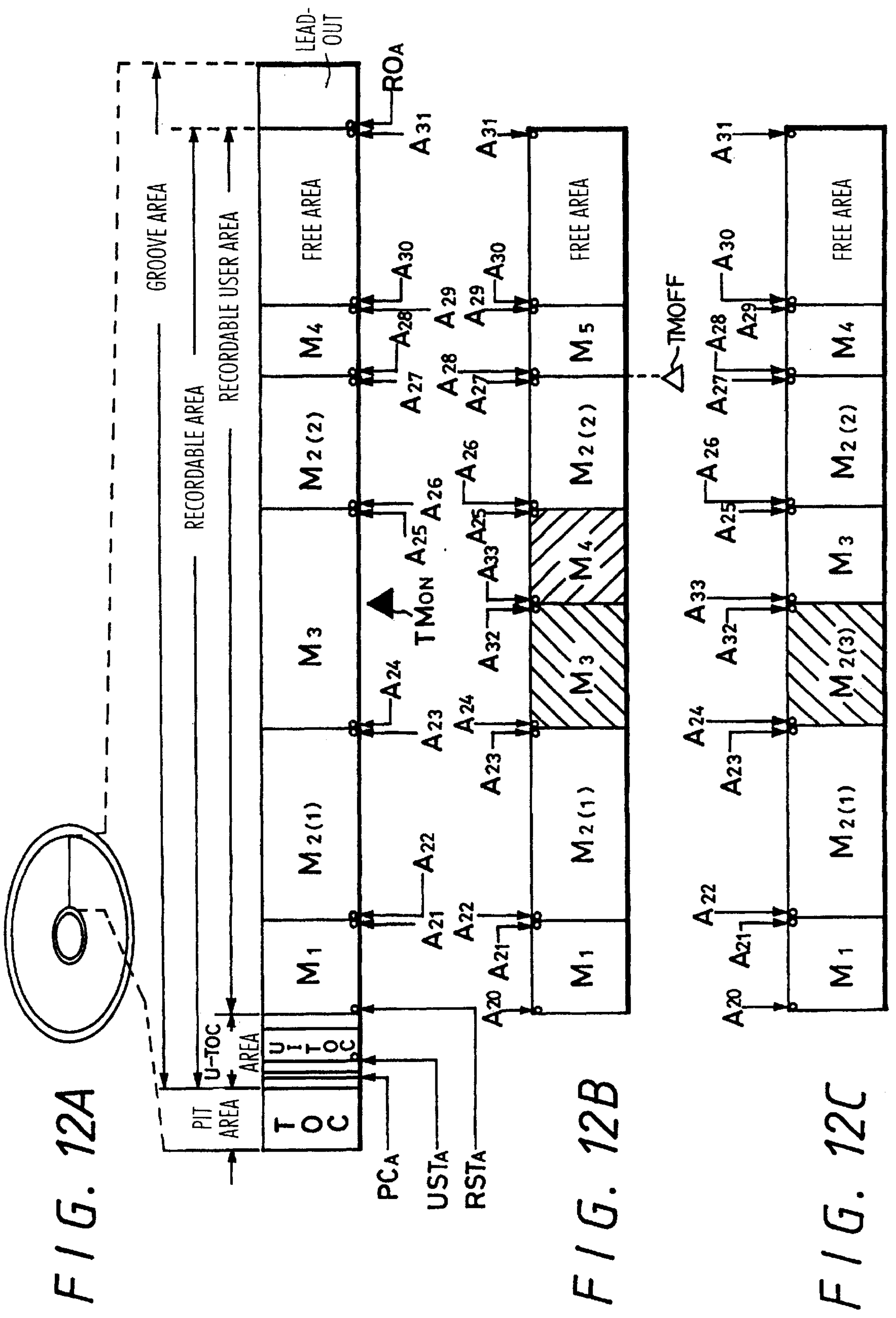
FIGS. 12A, 12B, 12C are diagrams used to explain a disk area structure and divide/combine edit.

An area structure of disk will be described herein. FIG. 12A schematically shows the disk area structure along the radius direction.

A magneto-optical disk is roughly composed of a ROM area in which data is recorded by pits formed a physical concavities and convexities and a groove area serving as a so-called magneto-optical area in which grooves are formed.

The P-TOC is repeatedly recorded as the pit area and in this P-TOC, the position of the U-TOC is indicated as a U-TOC start address $UST_A$. There are also indicated address positions, such as the read-out start address $RO_A$, the recordable user area start address $RST_A$, the trial area start address $PC_A$ shown in FIG. 12A.

The groove area is formed at the next of the pit area of the innermost peripheral side of this disk. Of this groove area, areas up to the address shown as the read-out start address $RO_A$ within the P-TOC are used as the recordable area in which data can be recorded and the following areas are used as the read-out area.

Further, of this recordable area, the recordable area in which data can be recorded covers the area from the recordable user area start address $RST_A$ to the position immediately before the read-out start address $RO_A$.

An area provided ahead of the recordable user area start address $RST_A$ within the groove area is used as the management area for effecting recording and reproducing operation and in which the U-TOC or the like is recorded. An area ranging from the position shown as the start address $PC_A$ of the trial writing area by one cluster is used as a trial writing area in which an output level of light beam output from the optical head 3 is set.

The U-TOC is continuously recorded by three clusters (1 cluster=36 sectors) from the position shown at the U-TOC start address $UST_A$ within the management area for the recording and reproducing operation.

Audio data in actual practice is recorded on the recordable user area as shown in FIG. 12A, for example. In this case, with respect to four music programs $M_1$ to $M_4$, a first music program $M_1$ is recorded on the segments of addresses $A_{20}$ to $A_{21}$, a second music program $M_2$ is recorded in the form of a portion $M_{2(1)}$ recorded on the segments of addresses $A_{22}$ to $A_{23}$ and a portion $M_{2(2)}$ recorded on the segments of the addresses $A_{26}$ to $A_{27}$. A third music program $M_3$ is recorded on the segments of addresses $A_{24}$ to $A_{25}$ and a fourth music program $M_4$ is recorded on the segments of addresses $A_{28}$ to $A_{29}$.

Such recording state is managed by the table pointers P-TNO1 to P-TNO4, P-FRA and the parts tables linked thereto within the U-TOC as described above.

The management state in this case is shown in FIG. 13. If the recordable user area shown in FIG. 12A has no defect, the table pointer P-DFA is set to "00h".

If parts table (06h) is indicated on the table pointer P-FRA in order for the table pointer P-FRA to manage the free area, then information which becomes the free area shown in FIG. 12A is indicated on the parts table (06h) in correspondence therewith. That is, an address $A_{30}$ is indicated as a start address and an address $A_{31}$ is indicated as an end address. In this case, since there exists no free area as other segment, link information of the parts table (06h) is set to "00h".

With respect to the first music program $M_1$, a start address $A_{20}$ and an end address $A_{21}$ are indicated on the parts table (01h) indicated on the table pointer P-TNO1. Since the music $M_1$ is recorded on one segment, link information of the parts table (01h) is set to "00h".

With respect to the second music program $M_2$, a start address $A_{22}$ and an end address $A_{23}$ are indicated on the parts table (02h) shown on the table pointer P-TNO2. The music program $M_2$, however, is separately recorded on two segments ($M_{a(1)}$ and $M_{2(2)}$) and the address $A_{22}$ and the address $A_{23}$ indicate only the segment of the first half portion ($M_{2(1)}$) of the music program $M_2$. Therefore, the parts table (03h) is indicated as the link information of the parts table (02h) and a start address $A_{26}$ and an end address $A_{27}$ are recorded on the parts table (03h) in order to indicate the segment of the second half portion ($M_{2(2)}$). Since following linking is not required, the link information of the parts table (03h) is set to "00h".

With respect to the third music program $M_3$ and the fourth music program $M_4$, the segment positions thereof are managed by the parts tables which are obtained from the starting points of the table pointers P-TNO3 and P-TNO4. Since only four music programs are recorded, the table pointers P-TNO5 to PTNO255 are not yet used and set to "00h".

The table pointer P-EMPTY which indicates the empty parts table indicates the part table (07h) in this case. Therefore, all empty parts tables from the parts table (07h) to the parts table (FFh) are linked by link informations.

(5. Divide and Combine Edit Processing)

Since the respective music programs (tracks) are managed by the U-TOC and the recording/reproducing operation is carried out on the basis of this management, it becomes possible to separate (divide) music and link (combine) music only by rewriting the U-TOC.

Operation and processing for executing divide/combine edit according to the first embodiment will be described with reference to FIGS. 12A to 18.

As described above, the recording and reproducing apparatus 30 includes the mark-on key 46 and the mark-off key 47 as the track mark key, and the remote commander 90 also includes a mark-on key 95 and a mark-off key 96 as the track mark key.

Further, the microphone 70 includes the track mark key 74 and the headphone 80 includes the track mark key 89. The track mark keys 74 and 89 are the operation keys which are served as both the mark-on key and the mark-off key.

While operation information entered by these operation keys is supplied to the system controller 11, the system controller 11 executes the divide processing by executing the processing shown in FIG, 16 with respect to information entered by the mark-on key 46 or 95 of the recording and reproducing apparatus 30 or the remote commander 90.

Figure 16:
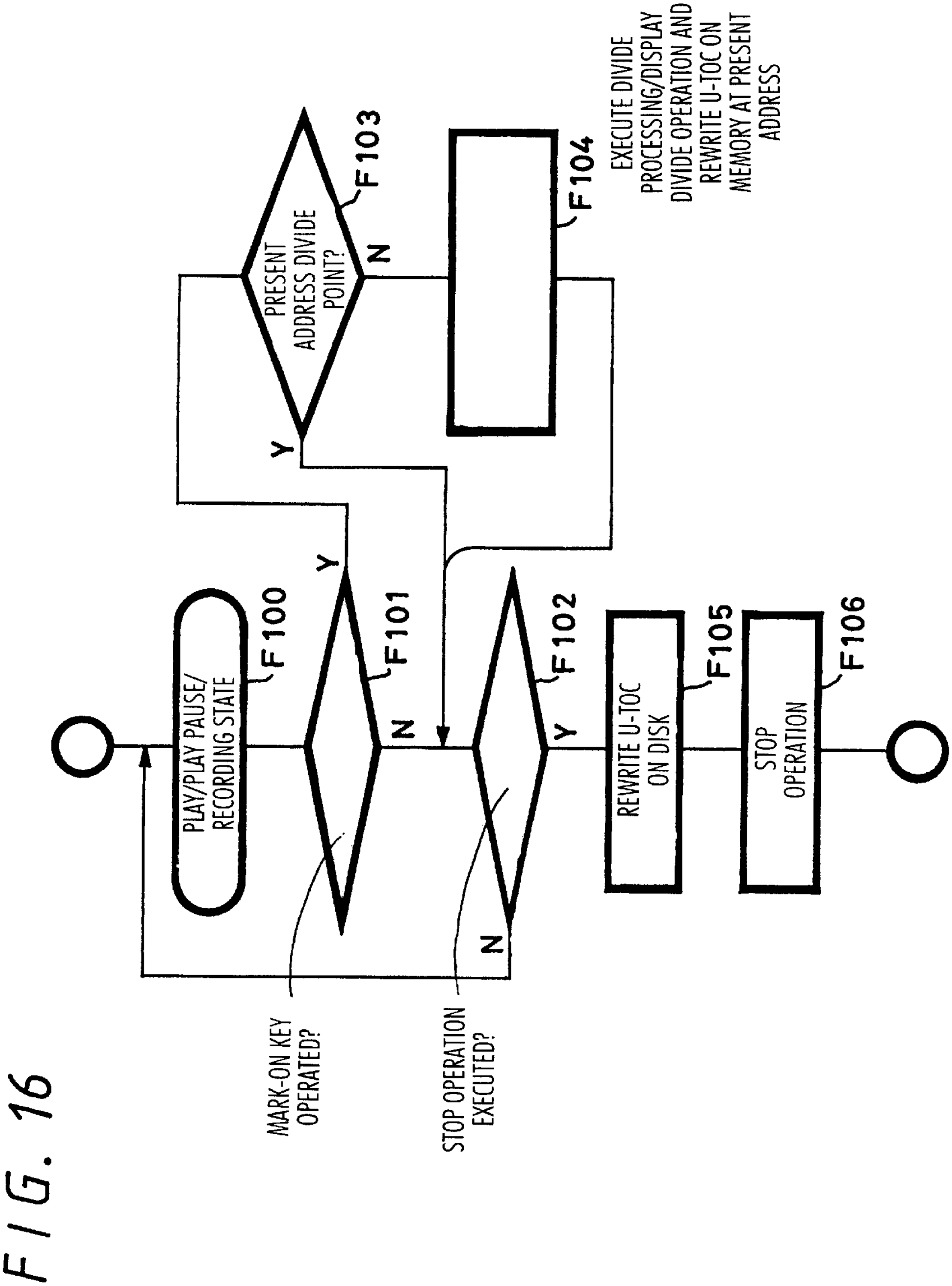
FIG. 16 is a flowchart of a divide processing according to the embodiment.

Step F100 in FIG. 16 shows the case that the system controller 11 controls the playback operation in the play mode, the case that the system controller controls the play pause operation or that the system controller controls the recording operation in the recording mode.

When the recording pause operation is carried out in the recording mode, the track number is automatically incremented at that point, i.e., the divide processing is executed. In that case, if the user carries out the divide operation, such operation is not needed and therefore the system controller 11 ignores such operation information.

If the user operates the mark-on key 46 or 95 when the system controller 11 executes the play, the play pause or the recording processing so that the recording and reproducing apparatus carries out the play operation, the play pause operation or the recording operation, then the processing proceeds from step F101 to step F103. It is determined whether the present address of the play or recording progress point or address of a point at which the play pause is executed represents a pause of music, i.e., the address is the divide point. This judgement can be carried out by determining whether the present address is agreed with or is very close to the start address or the end address of each music.

If a negative result is obtained at step F103, i.e., the present address represent the position of somewhere of a certain music, then the processing proceeds to a divide processing (F104). Incidentally, during the recording, the position at which the divide processing is executed is never agreed with the track changing point that was already divided so that the processing at step F103 is not required in particular.

In the divide processing at step F104, the U-TOC data written in the buffer memory 13 is rewritten and the divide operation is displayed. In that case, a message indicative of the fact that the divide operation is executed is displayed, the displayed track number is changed and the display of music proceeding time is reset.

In actual practice, the divide processing, i.e, the rewriting of the U-TOC is carried out as follows. If now the user depresses the mark-on key 46 at a timing point in which somewhere of a music $M_3$ represented by $TM_{ON}$ in FIG. 12A is being reproduced in the playback operation, for example, then the music $M_3$ is divided by the divide processing at step F104 into music $M_3$ and music $M_4$ along the address point as shown in FIG. 12B. At that time, the music $M_4$ that was originally recorded as 4th tune in FIG. 12A is changed to music $M_5$ of 5th tune as shown in FIG. 12B.

In this case, the U-TOC is rewritten from the state shown in FIG. 13 to the state shown in FIG. 14. Portions shown hatched represent rewritten portions.

Specifically, in the parts-table (04h) represented by the table pointer P-TNOS3, $A_{24}$ is recorded as the start address and $A_{25}$ is recorded as the end address. If an address obtained when the divide processing is executed is $A_{32}$, then this address becomes the end address of new music $M_3$ so that the end address of the parts-table (04h) is rewritten from $A_{25}$ to $A_{32}$.

Moreover, the music $M_4$ that was originally the 4th tune becomes the 5th tune because the track number thereof is incremented by dividing. Therefore, the numerical value that had been so far written is written in the table pointer P-TNO5 and the parts-table (05h) is displayed on the table pointer PTNO5. In other words, the segments $A_{28}$ and $A_{29}$ that had been indicated on the parts-table (05h) as the start address and the end address are managed as the 5th music $M_5$ newly.

A new 4th music that is generated by dividing is expressed by the parts-table (07h) that is not yet utilized. Specifically, the next address data $a_{33}$ of the address $A_{22}$ of the divided point is written in the parts-table (07h) as the start address, and the address data $A_{25}$ that was originally written in the parts-table (04h) as the end address data of the 3rd music is written in the parts-table (07h). Then, the table pointer PTNO4 is rewritten so as to designate the parts-table (07h).

Incidentally, since the parts-table (07h) is used to manage the new 4th music, the parts-table (07h) is removed from a link structure of a table pointer P-EMPTY and the table pointer P-EMPTY is rewritten so as to express a parts-table (08h). Link information of the parts-table (07h) is rewritten as "00h".

Dividing is completed by the above-mentioned rewriting and thereafter the music $M_3$ is managed as address data $A_{24}$ to $A_{32}$, the music $M_4$ is managed as address data $A_{33}$ to $A_{25}$ and the music $M_5$ is managed as address data $A_{28}$ to $A_{29}$.

According to this embodiment, the user can carry out the divide edit only by depressing the mark-on key 46 or 95 at a predetermined timing during play, play pause or recording.

Thereafter, stop operation is executed and play, play pause or recording is stopped (step F102→). In that case, at that timing point, the U-TOC held in the buffer memory 13 is written in the U-TOC area of the disk 1 in actual practice and the operation is stopped (F106).

Figure 17:
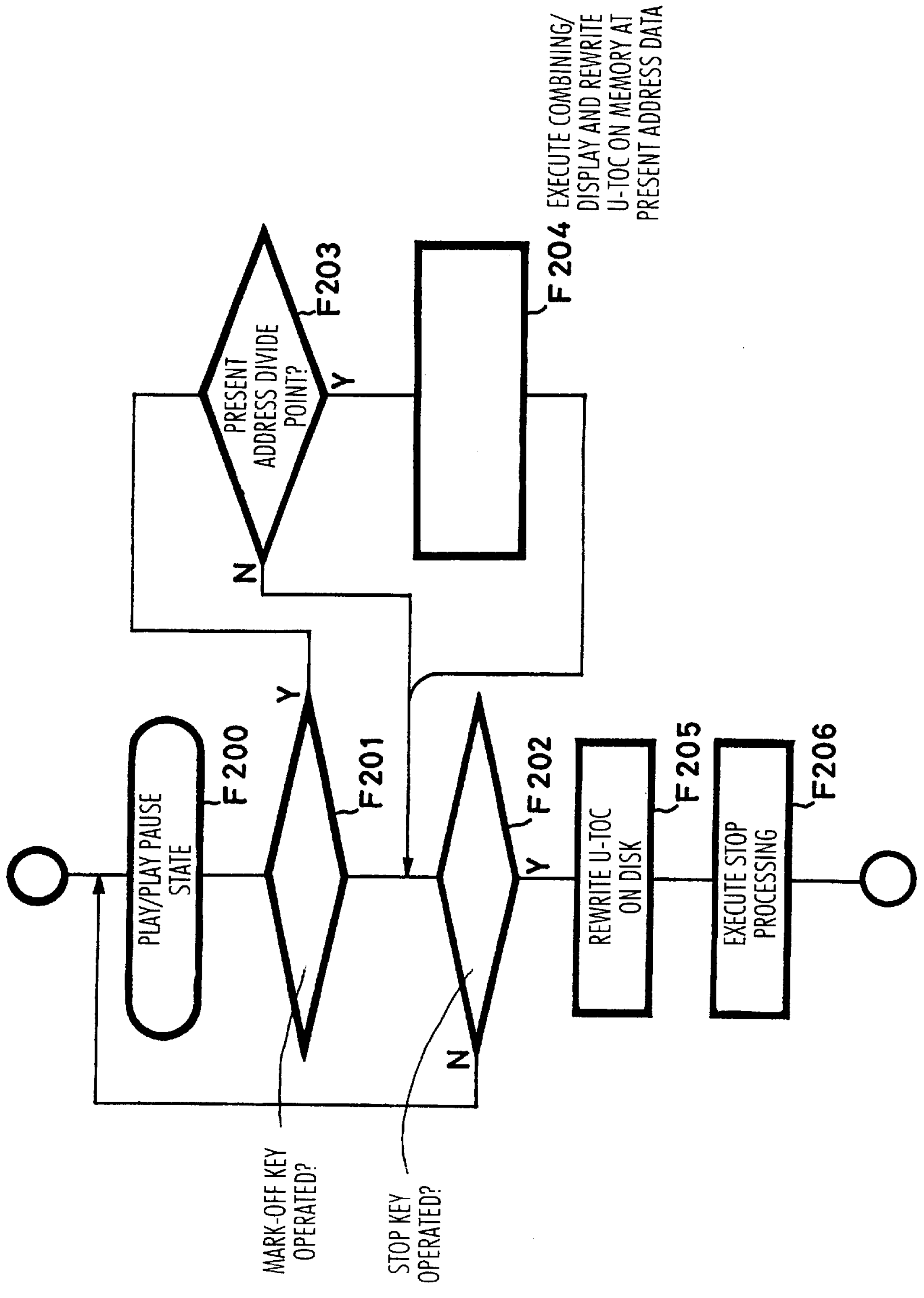
FIG. 17 is a flowchart of a combine processing according to the embodiment.

When the user depresses the mark-off key 47 or 96 of the recording and reproducing apparatus 30 or the remote commander 90, the combine processing is carried out under the control of the system controller 11 as shown in FIG. 17.

Step F200 in FIG. 17 shows the case that the system controller 11 controls play in the play mode or the case that the system controller controls the play pause.

Incidentally, the combine operation is never executed during the recording mode and therefore information entered by the mark-off key 47 or 96 is neglected during the recording mode.

If the user depresses the mark-off key 47 or 96 when the system controller 11 carries out the play or play pause so that the recording and reproducing apparatus is operated in the play mode or play pause mode, then the processing proceeds from step F201 to F203. Also in this case, it is determined whether present address data of the play proceeding point or present address data of the play pause represents a pause of music, i.e., the divide point.

If an affirmative result is obtained at step F203, i.e., the present address data indicates the divide position of the pause of a certain music (track), then the divide state is removed and the processing enters the combine processing to combine music (F204).

In the combining at step F204, the U-TOC data read in the buffer memory 13 is rewritten and the combining is displayed. In this case, a message indicative of combining is displayed, the track number displayed next is varied and a music proceeding time is advanced by combining tunes.

In actual practice, combining is carried out, i.e, U-TOC is rewritten as follows. In the state shown in FIG. 12B where dividing is carried out, if the user depresses the mark-off key 47 when an end portion (near the end address of segment $M_{2(2)}$) of music $M_2$ shown as $TM_{OFF}$ is reproduced in the reproducing mode, then the music $M_2$ and the music $M_3$ are combined by combining at step F204 as shown in FIG. 12C. At that time, the music $M_4$, $M_5$ that were the 4th and 5th music before combining as shown in FIG. 12B are changed to new 3rd and 4th music $M_3$, $M_4$ as shown in FIG. 12C after the 3rd music was combined with the 2nd music.

In this case, the U-TOC is rewritten from the state shown in FIG. 14 to the state shown in FIG. 15. Portions shown hatched show rewritten portions.

Specifically, although address data $A_{24}$ was recorded as start address data and address data $A_{25}$ was recorded as end address data of the 3rd music $M_3$ in the parts-table (04h) shown by the table pointer P-TNO3, segment data of the 3rd music is combined with the 2nd music so that the parts-table (04h) is combined with a link structure starting from the table pointer P-TNO2. That is, link information of the parts-table (03h) which expresses segment data $M_{2(2)}$ of the music $M_2$ is set to "04h" and accordingly, a link structure in the form of the parts-table (02h)→(03h)→(04h) is formed from the table pointer P-TNO2. Thus, the 2nd music and the 3rd music are combined and managed as new one music $M_2$.

Further, the music $M_4$ which was the 4th music in FIG. 12B becomes a 3rd music because the track number thereof is moved down by combining. Therefore, the numerical value that had been written in the table pointer P-TNO4 so far is written in the table pointer P-TNO3 and a parts-table (07h) is indicated on the table pointer P-TNO3. That is, the segment data of the segment data $A_{33}$ to $A_{25}$ that were indicated on the parts-table (07h) as start address data and end address data are managed as new 3rd music $M_3$.

Similarly, the music $M_5$ that was the 5th music in FIG. 12B becomes the 4th music because the track number is moved down by combining. Therefore, the numerical value that had been written in the table pointer P-TNO5 so far is written in the table pointer P-TNO4 and a parts-table (05h) is indicated on the table pointer P-TNO4. That is, the segment data of the segment data $A_{28}$ to $A_{29}$ that were indicated on the parts-table (05h) as start address data and end address data are managed as new 4th music $M_4$.

Then, there is no 5th music and the table pointer PTNO5 is set to "00h".

The combining is completed by the above-mentioned rewriting and then music $M_2$ is managed on the assumption that this music is recorded by three segment data ($M_{2(1)}$, $M_{2(2)}$, $M_{2(3)}$) of segment data $A_{22}$ to $A_{23}$, $A_{26}$ to $A_{27}$ and $A_{24}$ to $A_{32}$. Also, the music $M_3$ is managed by segment data $A_{33}$ to $A_{25}$ and the music $M_4$ is managed by segment data $A_{28}$ to $A_{29}$.

According to this embodiment, during play and play pause, it is possible for the user to carry out combine edit only by depressing the mark-off key 47 or 96 at a predetermined timing.

Thereafter, the stop operation is carried out and therefore the play or play pause is ended (step F202→YES). In that case, the U-TOC that is held in the buffer memory 13 at that timing point is practically written in the U-TOC of the data 1 (F205) and the operation is stopped (F206).

According to this embodiment, the microphone 70 and the headphone 80 also are provided with the track mark keys 74 and 89, by which the user can carry out divide and combine edit. The track mark keys 74, 89 are served as both mark-on keys and mark-off keys. Since the track mark keys 74, 89 are served as both the mark-on keys and the mark-off keys, the track mark keys 74, 89 can be disposed on a part of the microphone 70 and the headphone 80 with sufficient space and become suitable in use.

When the user enters track mark by the track mark keys 74 and 89, the track mark keys 74 and 89 are served as both the track mark-on keys and the track mark-off keys. Therefore, the system controller 11 executes the dividing/combining by the processing shown in FIG. 18.

Figure 18:
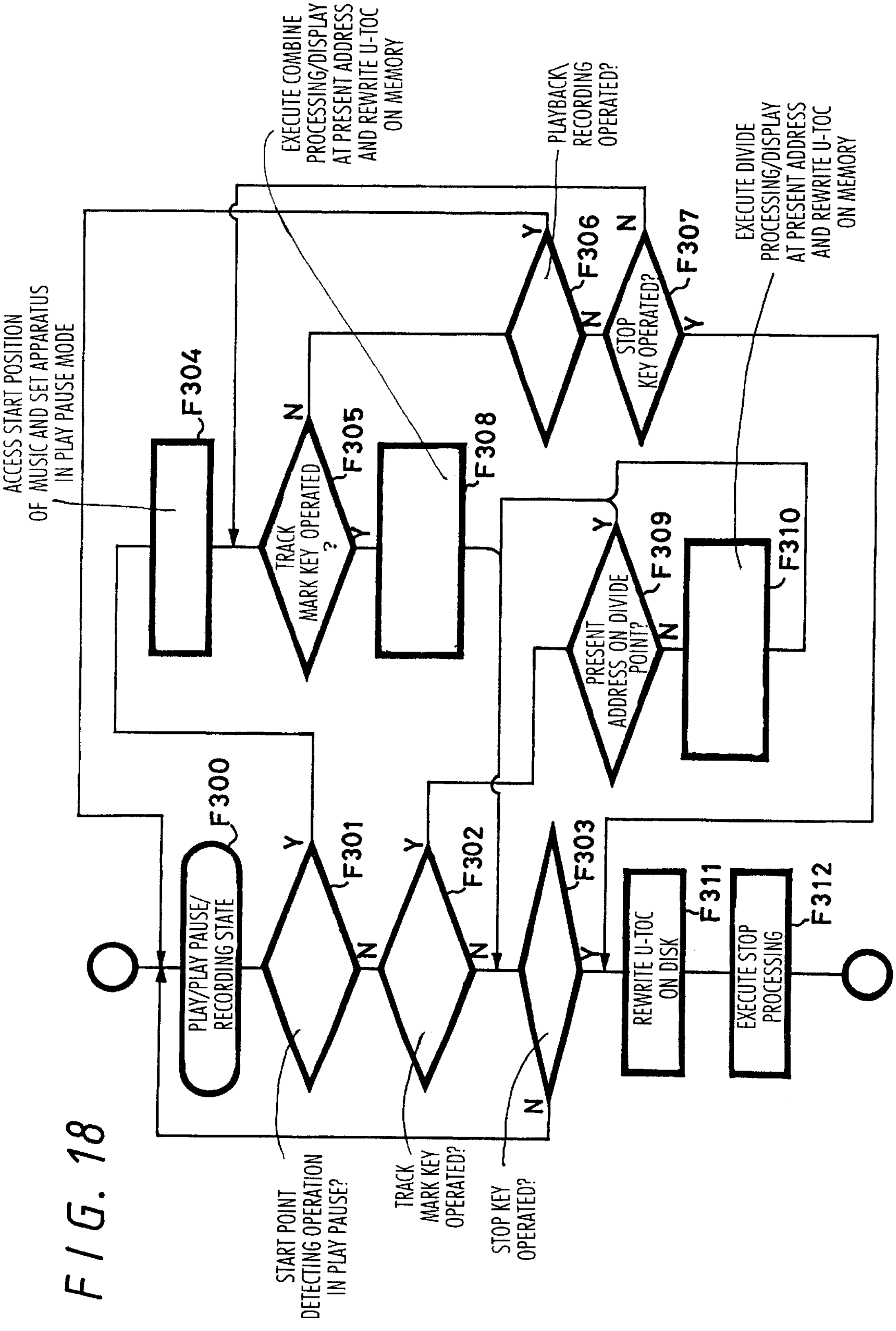
FIG. 18 is a flowchart of divide processing and combine processing according to the embodiment.

In FIG. 18, step F300 shows the case that the system controller 11 controls reproducing operation in the play mode, the case that the system controller controls play pause operation or the case that the system controller controls recording operation in the recording mode.

Operation of the track mark key 74 or 89 will be described. If the track mark key is operated in the play, recording or in the play pause at the position other than the starting position of music, it is determined that the track mark key is operated as the track mark-on key to execute the divide operation. If the track mark key 74 or 89 is operated when the recording and reproducing apparatus is placed in the pause mode at the starting position of the music, it is determined that the track mark key is operated as the mark-off key to carry out the combine operation.

If the user accesses the starting position of the music, i.e., finds the start portion of recorded music by using the music selection key (the music selection key 39 of the recording and reproducing apparatus body, the music selection keys 87, 88 of the headphone or music selection key of the remote commander), then the processing proceeds from step F301 to F304, whereat a track accessing is executed as an operation for finding out the start portion of recorded music and the recording and reproducing apparatus is set in the play pause mode. In this case, if play operation/recording operation is executed, then the processing returns to step F300 and predetermined processings are carried out (F306→F300). If the stop operation is executed, then the processing enters the stop processing (F307→F311).

When the recording and reproducing apparatus is set in the play pause state at the start position of music, if the track mark key 74 or 89 is operated, then the processing proceeds from step F305 to F308, whereat combining is executed. In other words, in the above-mentioned, the recording and reproducing apparatus is set in the play pause state at the start position of music, such state should be the dividing point and the user need not execute the divide processing. Therefore, it is determined that the operation is the combine operation and the U-TOC is rewritten so as to effect the combine editing.

If the track mark key 74 or 89 is depressed in the playback/playback pause/recording state, then the processing proceeds from step F302 to F309, whereat it is determined whether or not the address of the reproducing or recording proceeding point at that time is a pause of music, i.e., the divide point.

If a negative result is obtained at the step F309, i.e., then the above address is the position of somewhere of a certain piece of music. Thus, it is determined that the user operation is the divide operation. Then, the processing proceeds to the divide processing (F310), whereat the U-TOC is rewritten as the divide editing.

If the stop operation is carried out, the playback or playback pause or recording operation is stopped (step F303→YES or F307→YES). At that time, the U-TOC stored in the buffer memory at that time point is written in the U-TOC area of the disk in actual practice (F311) and the operation is stopped (F312).

According to the above-mentioned processing, it becomes possible to carry out the divide/combine processing by the track mark keys 74, 89 serving as mark-on/mark-off keys.

As described above, according to this embodiment, it is possible to carry out the desired divide or combine editing only by depressing the track mark keys 74, 89 or the mark-on keys 46, 95 or the mark-off keys 47, 96 during the playback, playback pause or recording mode. Therefore, since the above keys need not be operated after the apparatus had been moved to the editing mode, the apparatus becomes easy to handle upon editing.

In particular, by carrying out the track marking while the recording and reproducing are carried out, the apparatus can be considerably improved not only in editing operation but also in use in the succeeding reproduction. If the track is divided/combined at the desired point in the recording and reproducing modes, it is possible for the user to easily understand the divide/combine editing.

Further, since the divide/combine operation can be executed by the remote commander 90, the headphone 80 and the microphone 70, the editing can be carried out more easily when necessary. In particular, since the apparatus includes the microphone 70, the track marking can be carried out with ease by using the microphone installed on the desk in order to record speeches each time speaker is changed in the conference.

Operations for effecting the divide/combine editing and the corresponding processings are not limited to the embodiment and can be modified variously.

By way of example, the recording and reproducing apparatus body 30 and the remote commander 90 may include track mark keys serving as both the mark-on/mark-off keys. Conversely, the microphone 70 and the headphone 80 may include the mark-on key and the mark-off key separately.

Also, other equipments to be connected may include the track mark operating means and the mark-on/mark-off operating means.

Also, it is needless to say that the operation information input means is not limited to the system shown in FIG. 8 and may be modified variously.

Furthermore, as the remote commander, it is possible to use a radio-wave transmission type or wire connection type remote commander.

To prevent the user from inadvertently carrying out the track mark-on/mark-off operation, the track mark operation unit of the microphone and the headphone may become effective only when the recording is made.

(6. Auto Track Numbering Mode Setting Processing)

In the recording and reproducing apparatus according to the embodiment of the present invention, when audio data input by the microphone is recorded, it is possible to automatically vary track numbers at every predetermined time by the processing of auto track numbering (ATN) mode. In other words, under the control of the system controller 11, U-TOC data is rewritten such that recorded audio data is divided into tracks at every predetermined time point.

Such processing is automatically carried out when audio data is input through the microphone if the user turns on the ATN mode. Operation of the ATN mode will be described with reference to FIG. 19.

Figure 19:
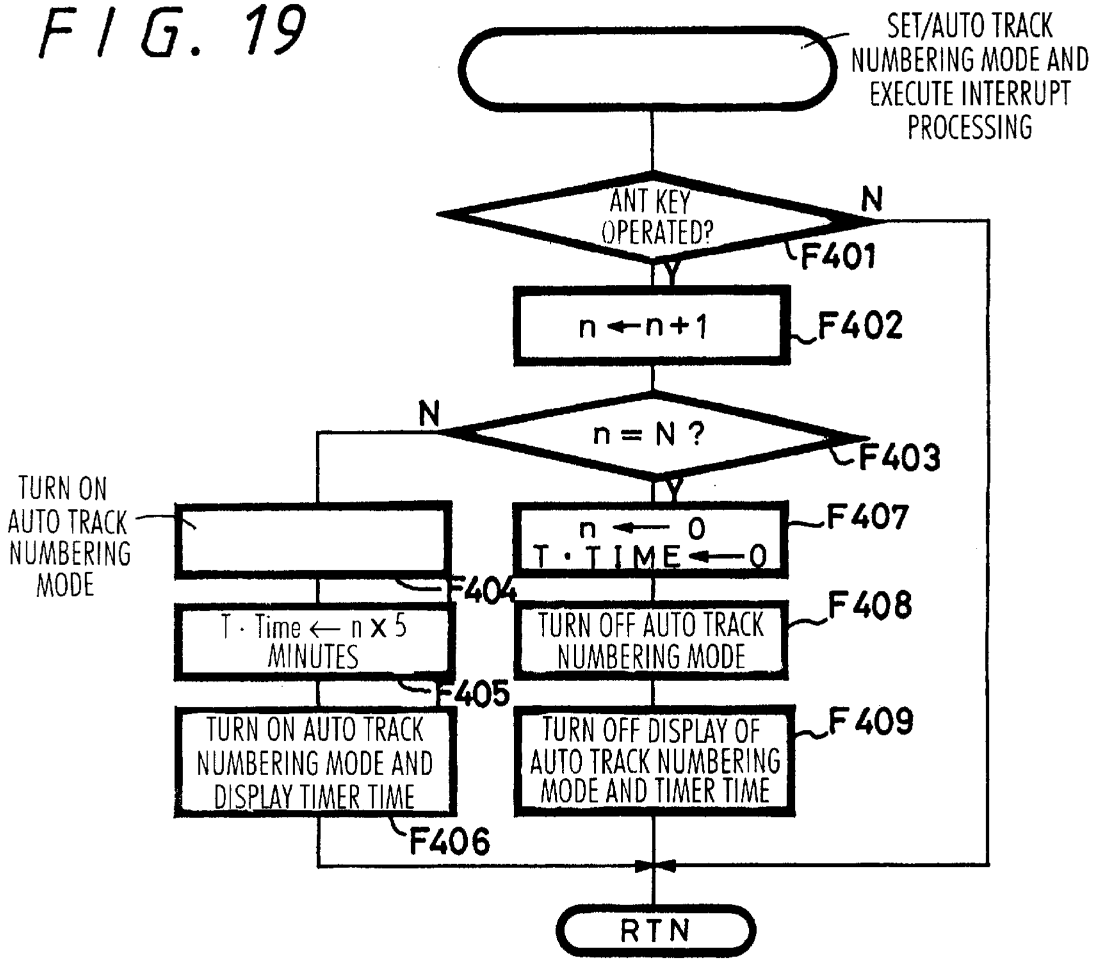
FIG. 19 is a flowchart of an ATN mode setting processing according to the embodiment.

A flowchart of FIG. 19 shows an interrupt routine executed at every predetermined time interval (e.g., several to several 100s of milliseconds) as the processing done by the system controller 11. If the interrupt processing is executed during a variety of operations, such as stop/playback/pause/recording, then the system controller 11 executes the ATN operation correspond to user's ATN mode operation.

When the ATN mode is set, the mode on/off should be set in order to determine whether or not the automatic track numbering is carried out upon recording. Also, it is necessary to set a time interval in which the track numbering (division) is carried out in the mode-on state, i.e., a time interval to increment the track number. The time intervals prepared herein are 5 minutes, 10 minutes, 15 minutes and 20 minutes.

Figure 20:
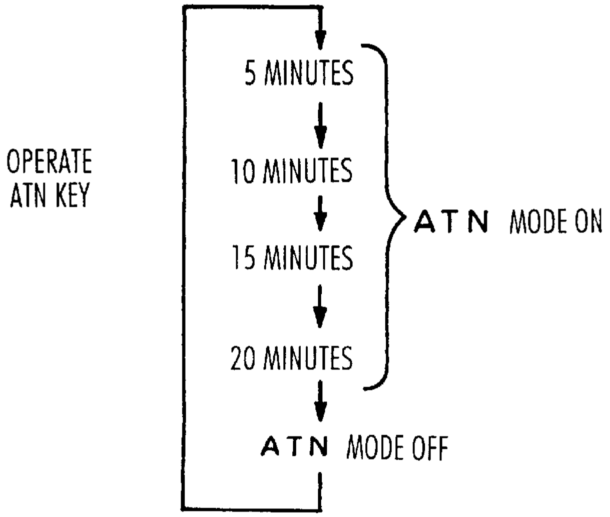
FIG. 20 is a diagram used to explain an operation system used when the ATN mode setting processing according to the embodiment is executed.

The user sets the mode by depressing the ATN 46*a* (FIG. 3A) a predetermined number of times. FIG. 20 shows an example of the setting operation. Arrows correspond to depressions of the ANT key 46*a*.

When the ATN key 46*a* is depressed in the ATN mode-off state, the ATN mode with a time interval of 5 minutes is turned on. In response to each depression of the above key, the ATN mode with a time interval of 10 minutes is turned on, the ATN mode with a time interval of 15 minutes is turned on and the ATN mode with a time interval of 20 minutes is turned on. When the ATN key 46*a* is depressed one more time under the condition that the ATN mode with a time interval of 20 minutes is turned on, the ATN mode is turned off.

In order to realize the above setting operations, the processing shown in FIG. 19 is executed.

If the ATN key 46*a* is not operated when the interrupt processing of FIG. 19 is executed, then the processing proceeds from step F101 and ended. If the ATN key 46*a* is operated when the interrupt processing is executed, then the processing proceeds from step F101 to F402, whereat a variable n is incremented. The variable n is set to n=0 as an initial set value when the apparatus is powered.

Then, the variable n is compared with a constant N (F103). The constant N is determined in response to the number in which the ATN key 46*a* that was toggled as shown in FIG. 20 is depressed per period. In this case, as clear from FIG. 20, if the above key is depressed 5 times under the condition that the ATN mode is turned off, then the ATN mode is turned off again. Therefore, if the variable n=0 when the ATN mode is turned off, then the constant N=4.

If the ATN key 46*a* is depressed once when the ATN mode is turned off, then the variable n=1. Since n≠N, the processing proceeds to step F404. Then, the ATN mode is turned on and n×5 minutes, i.e., 5 minutes are set as a timer time T·TIME (F405). That is, the ATN mode with a time interval of 5 minutes is turned on. The display unit 31 then displays that the ATN mode is turned on and that the track is divided at a time interval of 5 minutes (F406).

Thereafter, if the ATN key 46*a* is depressed again, then the variable n=2. Since n≠N, the processing proceeds to step F404, whereat the ATN mode is similarly turned on. Then, n×5 minutes, i.e., 10 minutes are set as the timer time T·TIME (F405). That is, the ATN mode with a time interval of 10 minutes is turned on. Then, the display unit 31 displays that the ATN mode is turned on and that the track is divided at a time interval of 10 minutes (F406).

If the ATN key 46*a* is further depressed, the ATN mode with a time interval of 15 minutes and the ATN mode with a time interval of 20 minutes are turned on sequentially by the similar processing.

If the ATN key 46*a* is depressed at a time point in which the ATN mode with a time interval of 20 minutes is turned on, then n=4 and n=N is satisfied in step F403. Therefore, the processing proceeds to step F407, whereat the variable n=0 and the timer time T·TIME=0. Then, the ATN mode is turned off (F408) and the messages displayed to indicate that the ATN mode is on and the time interval by the display unit 31 are turned off (F409).

Thereafter, if the ATN key 46*a* is depressed again, then the variable n=1. Therefore, the ATN mode with a time interval of 5 minutes is turned on.

Specifically, since the operation of the ATN key 46*a* is monitored by the processing shown in FIG. 19, the mode operation in the toggle form shown in FIG. 20 is realized and it is sufficient that the user continuously depresses the ATN key 46*a* until the desired mode state is presented while monitoring the display.

(7. Processing Executed When Audio Data Input Through the Microphone is Recorded)

In response to the above mode operation, the ATN mode is turned on/off and the time interval for executing the numbering when the ATN mode is turned on is set as described above. When operation for recording an analog signal input from the microphone on the disk 1 is started, a processing shown in FIG. 21 is executed based on the mode setting.

Figure 21:
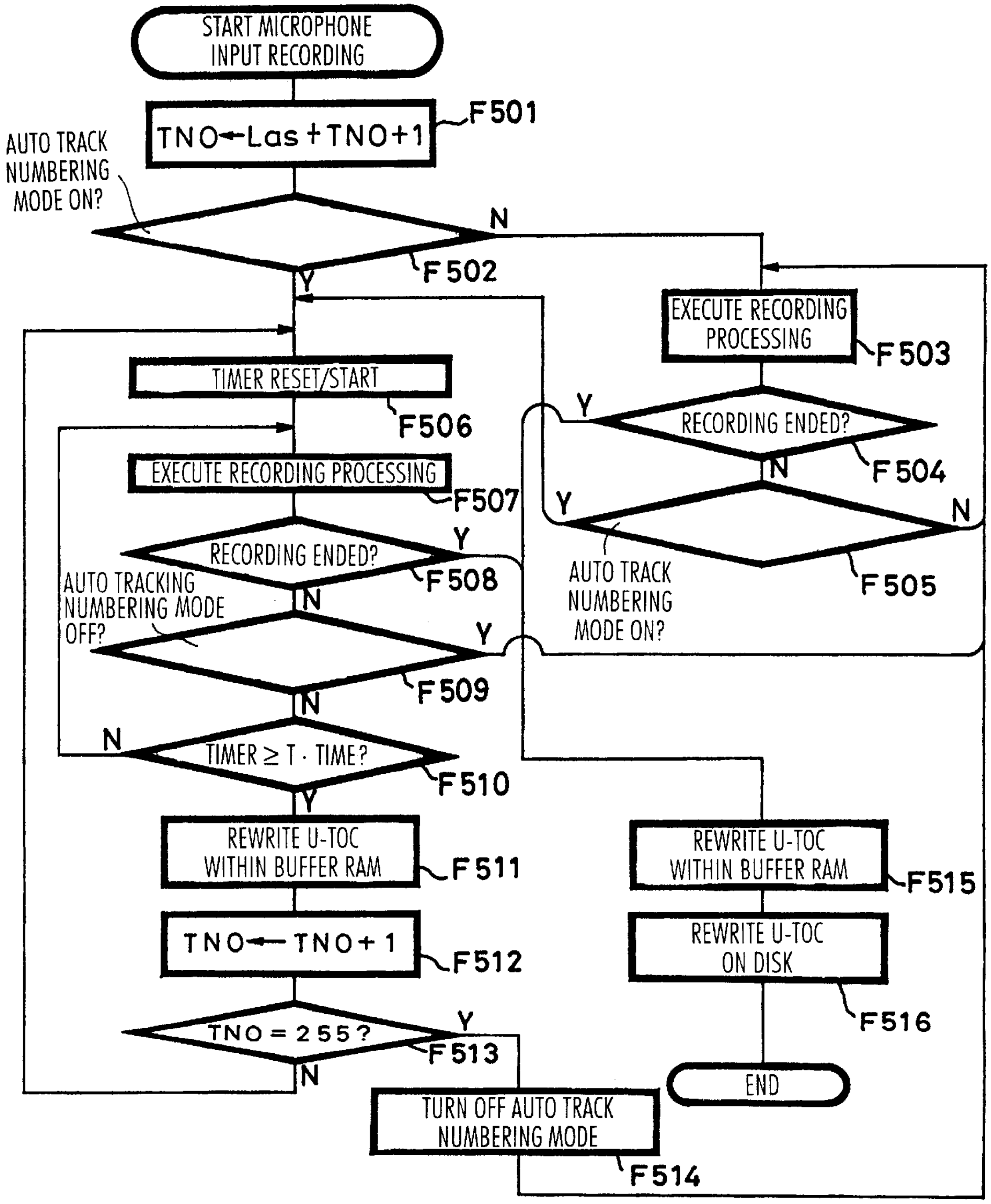
FIG. 21 is a flowchart of a processing executed in the recording according to the embodiment.

While an ATN mechanism processing shown in FIG. 21 is executed only when the signal input from the microphone is recorded, the present invention is not limited thereto and that processing may be executed when an analog signal input through an analog line is recorded.

When the recording is started by depressing the recording key 33 under the condition that it is detected that the microphone is connected to the microphone terminal 56, the system controller 11 starts the processing shown in FIG. 21.

When the recording of the input signal input from the microphone is instructed, initially, a value which results from adding 1 to the last track number (Last TNO) recorded on the U-TOC sector 0 is set as the track number TNO of recorded data (F501).

Specifically, if a disk in which no data is recorded is used, then the track number becomes the track number 1. If a disk in which audio data of three track were already recorded is used, then the track number becomes the track number 4.

It is determined whether or not the ATN mode is turned on (F502). If the ATN mode is off, then the processing proceeds to step F503, whereat the normal recording processing is executed. This recording processing is continued until it is determined in step F504 by operation of the stop key 38 or the lack of the free area of the disk that the recording is ended or until it is determined in step F505 that the ATN mode is turned on when the user executes the ATN mode operation during the recording.

When the recording is ended, the U-TOC data is updated within the buffer memory 13 in response to the recording operation in step F515 and the updated U-TOC data is written in the disk 1 at step F516. Then, the processing is ended.

If the recording processing is ended under the condition that the ATN mode is turned off, then audio data recorded on the disk are all managed as one track by the updated U-TOC.

If it is determined in decision step F502 that the ATN mode is turned on, then the timer is reset and starts counting (F506). Then, the recording processing is started (F507).

Since the timer counting is executed during the recording processing, it is determined in step F510 whether or not the time count value reaches the timer time T·TIME.

The timer time T·TIME is set to a time, such as 5 minutes, 10 minutes or the like designated by the user according to the ATN mode setting processing. If the timer time T·TIME=5 minutes, then the processing proceeds to step F511 at a time point in which the recording processing is executed for 5 minutes. The U-TOC data stored in the buffer memory 13 is rewritten. In other words, the start address and the end address are written in the parts table led out by the table pointer (e.g., P-TNO1) corresponding to the track No. TNO such that audio data of first 5 minutes is managed as one track.

Then, the track No. TNO is incremented (F512). In other words, audio data that will be recorded hereinafter are managed as data of the next tracks.

It is determined in step F513 whether or not the track No. TNO=255. The reason for this is that up to 255 tracks can be managed as will be clear from the U-TOC structure shown in FIG. 10. If the track No. TNO=255, then the ATN mode is forced to be turned off (F514) and the processing proceeds to the next normal recording processing (F503). That is, the track of the track No. 255 is not divided until the recording is ended.

If the track No. TNO is not 255, then the processing returns to step F506, whereat the timer is reset/started and the recording processing is executed while confirming the count value (F507 to F510). Then, if five minutes are passed, the U-TOC data is similarly rewritten within the buffer memory 14 such that the track is divided and then the track No. TNO is incremented (F511, F512).

The processing proceeds from step F508 whose processing is ended when the recording processing of the loop from the steps F506 to F513 is stopped or the free area is fully used to step F515. The U-TOC data is updated within the buffer memory 13 in response to the recording operation and the updated U-TOC data is written in the disk 1 (F516) and the processing is ended.

If the ATN mode of 5-minute interval, for example, is turned on during the start to end of the recording, then the recorded audio data is managed by the U-TOC under the condition that the track is divided at the interval of 5 minutes.

If the user operates the ATN key 46*a* during the recording, then in the interrupt processing shown in FIG. 19, the ATN mode on/off and time interval (5 minutes, 10 minutes, 15 minutes, 20 minutes) for dividing the track are switched.

If the setting of the timer time·TIME is changed as the time interval at step F405 in FIG. 19, then at that timing point, the comparison reference value with the timer count value at step F510 is changed and then the processing proceeds from step F510 to F511 when a timer time reaches a new set time.

Although the timer time is switched to 5 minutes if the user depresses the ATN key 46*a* twice under the condition that a timer time of 20 minutes is set, in this case, it is frequently observed that timer count value exceeds 5 minutes. In this case, (timer count value)>(timer time T·TIME) and the processing proceeds to step F510. Accordingly, although the duration of this track does not become 5 minutes or 20 minutes, the processing flow may be set such that the track is divided into tracks of 5-minute interval after the track was temporarily divided at 20 minutes. In other words, all tracks (except the last track at the recording end timing point) can be constantly divided at a predetermined time interval (i.e., any one of 5 minutes, 10 minutes, 15 minutes, 20 minutes).

If the ATN mode is turned off during the recording, then the processing proceeds from step F509 to F503, whereat the following ATN operation is not executed. Further, if the ATN mode is switched from ON to OFF during the recording, then the processing proceeds from step F505 to F506, then the following ATN operation is executed.

(8. Various Auto Track Numbering Operations During the Recording)

The ATN operation that is realized by the processing shown in FIGS. 19 and 21 will be described with reference to various kinds of examples of FIGS. 22 to 28.

The respective examples show the case that an information signal indicating a conference or the like input from the microphone is recorded on the disk on which no data is recorded at all for 28 minutes.

Figure 22:
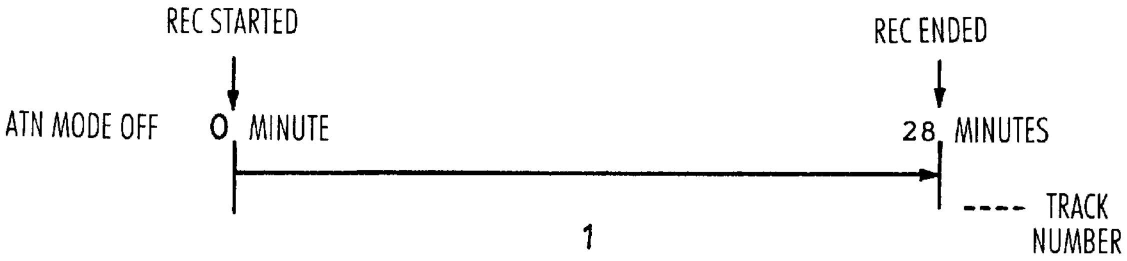
FIG. 22 is a diagram used to explain a track management state presented when recording is carried out under the condition that the ATN mode is off according to the embodiment.

FIG. 22 shows the case that the information signal is recorded in the ATN mode off wherein audio data of 28 minutes from the start to the end of the recording are all recorded as tracks. In this case, the recording and reproducing apparatus is an ordinary recording apparatus. If the user wishes to hear data of the portion of 15 minutes, then the reproduced portion should be advanced to the portion of 15 minutes by the fast forward search.

Figure 23:
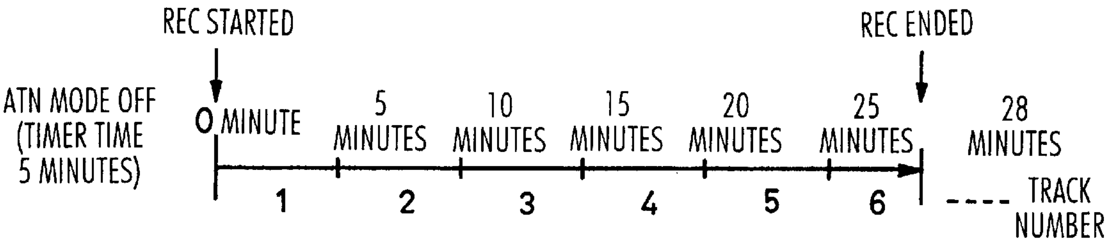
FIG. 23 is a diagram used to explain a track management state presented when recording is carried out under the condition that the ATN mode is on at an interval of 5 minutes according to the embodiment.

FIG. 23 shows the case that the ATN mode of 5-minute interval is turned on. As illustrated, the track number is updated at the interval of 5 minutes and audio data of 28 minutes are divided from the track 1 to the track 6 when the recording is ended.

That is, in the U-TOC, the start address and the end address of the portion in which data of 0 to 5 minutes are recorded are recorded on the parts table shown by the table pointer P-TNO1. Similarly, start addresses and end addresses of the positions at which data of 5 to 10 minutes, 10 to 15 minutes, 15 to 20 minutes, 20 to 25 minutes and 25 to 28 minutes are recorded are respectively recorded on the parts tables led out by the table pointers TNO2 to P-TNO6.

Therefore, if the user wishes to reproduce the portion of 15 minutes, then the user can immediately listen to sounds of that portion by accessing the start position of the track 4.

Figure 24:
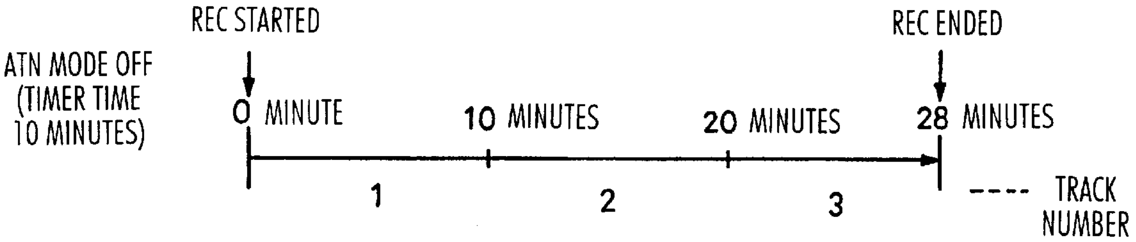
FIG. 24 is a diagram used to explain a track management state presented when recording is carried out under the condition that the ATN mode is on at an interval of 10 minutes according to the embodiment.

FIG. 24 shows the case that the ATN mode of 10-minute interval is turned on. As illustrated, the track number is updated at the interval of 10 minutes and audio data of 28 minutes is divided from the track 1 to the track 3 when the recording is ended.

Figure 25:
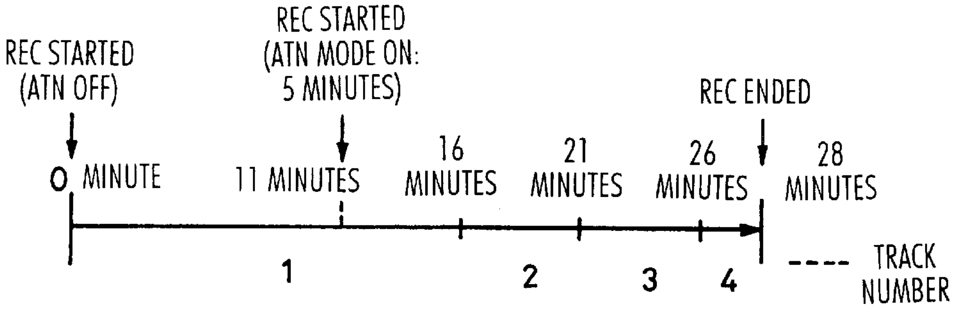
FIG. 25 is a diagram used to explain a track management state presented when the ATN mode is switched upon recording according to the embodiment.

FIG. 25 shows the case that the ATN mode of 5-minute interval is turned on by the user by depressing the ATN key 46*a* at a timing point of 11 minutes, for example, although the ATN mode is turned off when the recording is just started.

In this case, the portion ranging from 0 to 16 minutes are set to the track 1 and portions are divided at the interval of 5 minutes to the track 2, the track 3 and the track 4. In such case, the track may be divided at the timing point (portion of 11 minutes) where the ATN mode is turned on.

Figure 26:
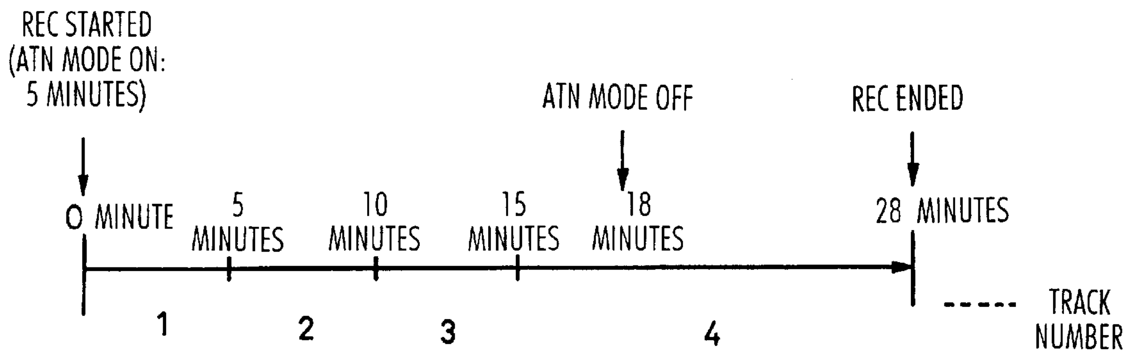
FIG. 26 is a diagram used to explain a track management state presented when the ATN mode is switched upon recording according to the embodiment.

FIG. 26 shows the case that the ATN mode is turned off by the user by depressing the ATN key 46 at a timing point of 18 minutes, for example, although the ATN mode of 5-minute interval is turned on when the recording is just started.

In this case, the portions of 0 to 15 minutes are set to the track 1, the track 2 and the track 3. If the ATN mode is turned off before the track 4 is divided at the timing point of 20 minutes, then audio data of 28 minutes in which the recording is ended from the audio data of the portion of 15 minutes are set to the track 4.

Figure 27:
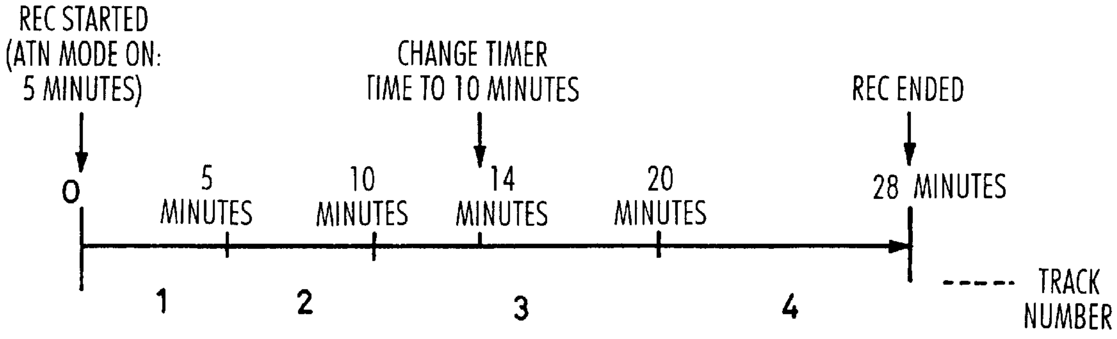
FIG. 27 is a diagram used to explain a track management state presented when a time interval setting is switched upon recording according to the embodiment.

FIG. 27 shows the case that the ATN mode is switched to the 10-minute interval by the user by operating the ATN key 46 at a timing point of 14 minutes, for example, although the ATN mode of 5-minute interval is turned on when the recording is just started.

In this case, the audio data of 0 to 10 minutes are set to the track 1 and the track 2 and audio data of 10 to 28 minutes are divided to the track 3 and the track 4 at the interval of 10 minutes. Also in this case, the track may be divided at a timing point (timing point of 14 minutes) where the mode setting is switched.

As is clear from these examples, according to this embodiment, since the ATN processing is carried out in response to the user's operation during the recording, if the user wishes to hear a desired portion upon playback, it is possible to search a desired portion easily and readily by detecting the starting portion of the recorded data.

While the on/off of the ATN mode and the time interval of dividing the track can be set by using the ATN key 46*a* as described above, the mode on/off operation key and the operation key for setting the time interval in which the track is divided may be provided independently.

(9. System for Using the Auto Track Numbering Mode Setting Key also as the Recording Key)

The ATN mode on/off and operation key for setting the time interval of dividing the track may be served also as the recording key 33 and therefore the ATN key 46*a* may be removed.

Figure 28:
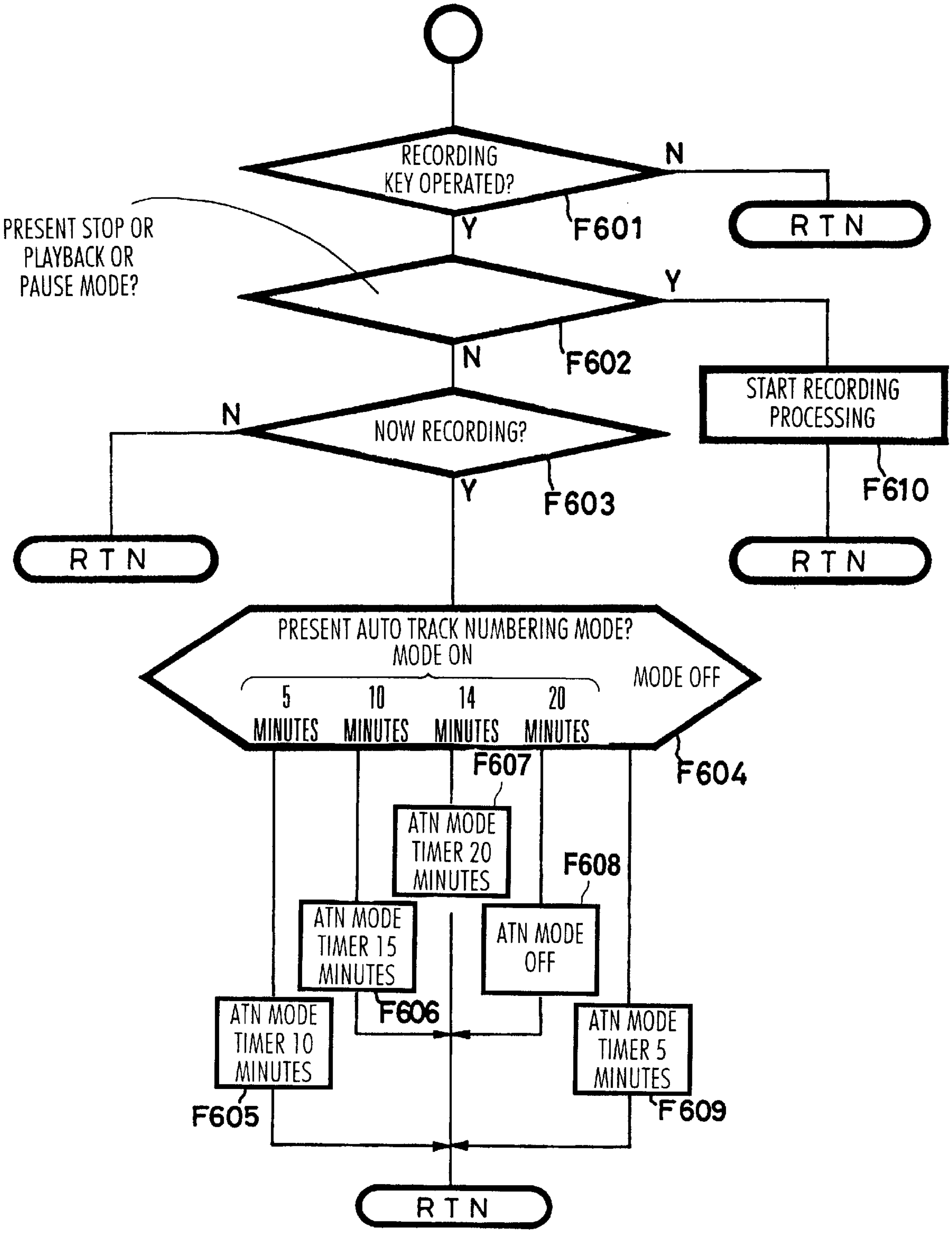
FIG. 28 is a flowchart of a processing system executed when a record key and an ATN key are in combined use according to the embodiment.

In this case, the system controller 11 may execute the decision processing of FIG. 28 for the operation of the recording key.

If the recording key 33 is operated, then the processing proceeds from step F601 to F602 whereat the present operation state is judged. Then, if the present operation state corresponds to any one of the present stop state, the reproducing state and the pause state, then it is determined that the operation is the recording operation. Thus, the recording processing is started at step F610.

If the recording key 33 is operated during the recording, a negative result is obtained at step F602 and an affirmative result is obtained at step F603. Then, the processing proceeds to step F604.

In this case, the operation of the recording key 33 is not recognized as the operation for recording but is recognized as the operation for setting the ATN mode.

Then, at step F604, the present ATN mode state is judged.

If now the ATN mode of 5-minute interval is turned on, then the processing proceeds to step F605, whereat the ATN mode of 10-minute interval is turned on.

If now the ATN mode of 10-minute interval is turned on, then the processing proceeds to step F606, whereat the ATN mode of 15-minute interval is turned on.

If now the ATN mode of 15-minute interval is turned on, then the processing proceeds to step F607, whereat the ATN mode of 20-minute interval is turned on.

If now the ATN mode of 20-minute interval is turned on, then the processing proceeds to step F608, whereat the ATN mode is turned off.

If now the ATN mode is turned off, then the processing proceeds to step F609, whereat the ATN mode of 5-minute interval is turned on.

In other words, during the recording, the recording key 33 may function as the operation key for setting the ATN mode owing to the toggle form of FIG. 20.

The present invention is not limited to the above-mentioned embodiment and may be modified variously.

The setting of the time interval is not limited to the above-mentioned examples and other time intervals may be set. When necessary, only one fixed time interval may be set.

Further, the ATN key may be disposed on a remote commander for controlling the recording and reproducing apparatus via infrared rays and the remote control operation units provided on the headphone and the microphone connected thereto.

Further, the processing system for the ATN operation is not limited to those of the examples shown in FIGS. 19 and 21 and may be considered variously.

We claim:

1. An apparatus for recording and/or reproducing a recording medium comprising:

recording and reproducing means for recording or reproducing data on or from a recording medium in which management information for recording or reproducing data is recorded together with data;

designating means for designating a break position of one data;

control means for controlling the recording and reproducing means on the basis of the management information so that the recording and reproducing means records or reproduces data on or from a recording medium, recognizing a time point in which the designating means designates the break position when the designating means is operated while the recording and reproducing means records or reproduces data on or from the recording medium, controlling the recording and reproducing means so that the recording and reproducing means rewrites the management information, and combining two data before and after the break position to one continuous data if the designating means is operated when a scanning position of the recording and reproducing means is placed at the break position under the condition that the recording and reproducing means reproduces data from the recording medium; and operating means for setting a pause state while data is recorded on or reproduced from the recording medium and wherein the control means refuses an output signal from the designating means when the pause state is set by the operating means while data is being recorded on the recording medium.

2. An apparatus for recording and/or reproducing a recording medium according to claim 1, wherein the management information is not rewritten when the control means detects that the position designated by the designating means or the position at which the pause state is set by the operating means is a starting end, an ending end or a position near the starting end or the ending end of one data.

3. An apparatus for recording and/or reproducing a recording medium comprising:

recording and reproducing means for recording or reproducing data on or from a recording medium in which management information for recording or reproducing data is recorded together with data;

designating means for enabling a user to designate a break position of one data; and control means for controlling the recording and reproducing means on the basis of the management information so that the recording and reproducing means records or reproduces data on or from a recording medium, recognizing a user-defined time point in which the designating means designates the break position when the designating means is operated while the recording and reproducing means records or reproduces data on or from the recording medium and controlling the recording and reproducing means so that the recording and reproducing means rewrites the management information.

4. An apparatus for recording and/or reproducing a recording medium according to claim 3, further comprising operating means for setting a pause state while data is recorded on or reproduced from the recording medium and wherein the control means refuses an output signal from the designating means when a pause state is set by the operating means while data is being recorded on the recording medium.

5. An apparatus for recording and/or reproducing a recording medium according to claim 3, wherein the management information is not rewritten when the control means detects that the position designated by the designating means or the position at which the pause state is set by the operating means is a starting end, an ending end or a position near the starting end or the ending end of one data.

6. An apparatus for recording and/or reproducing a recording medium according to claim 3, wherein the control means combines two data before and after the break position to one continuous data if the designating means is operated when a scanning position of the recording and reproducing means is placed at the break position under the condition that the recording and reproducing means reproduces data from the recording medium.

* * * * *